(12) United States Patent
Chen et al.

(10) Patent No.: US 12,245,273 B2
(45) Date of Patent: *Mar. 4, 2025

(54) ELECTRONIC DEVICE, COMMUNICATION METHOD AND STORAGE MEDIUM

(71) Applicant: Sony Group Corporation, Tokyo (JP)

(72) Inventors: Wei Chen, Beijing (CN); Xiaoyu Zhao, Beijing (CN); Xin Guo, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,671

(22) Filed: Nov. 16, 2023

(65) Prior Publication Data

US 2024/0121817 A1  Apr. 11, 2024

Related U.S. Application Data

(63) Continuation of application No. 17/056,428, filed as application No. PCT/CN2019/090572 on Jun. 10, 2019, now Pat. No. 11,838,945.

(30) Foreign Application Priority Data

Jun. 15, 2018 (CN) .......................... 201810616425.3

(51) Int. Cl.
*H04W 74/08* (2024.01)
*H04W 72/121* (2023.01)
(Continued)

(52) U.S. Cl.
CPC ......... *H04W 74/08* (2013.01); *H04W 72/121* (2013.01); *H04W 72/566* (2023.01); *H04W 74/006* (2013.01)

(58) Field of Classification Search
None
See application file for complete search history.

(56) References Cited

U.S. PATENT DOCUMENTS 11,838,945 B2 * 12/2023 Chen ..................... H04W 74/08
2010/0254392 A1    10/2010 Katar et al.
(Continued)

FOREIGN PATENT DOCUMENTS

CN         102045138 A      5/2011
CN         102088786 A      6/2011
(Continued)

OTHER PUBLICATIONS

International Search Report and Written Opinion mailed on Aug. 28, 2019 for PCT/CN2019/090572 filed on Jun. 10, 2019, 10 pages including English Translation of the International Search Report.
(Continued)

*Primary Examiner* — Mohammad S Adhami
(74) *Attorney, Agent, or Firm* — XSENSUS LLP

(57) ABSTRACT

The present disclosure relates to electronic device, communication method and storage medium in a wireless communication system. An electronic device on control device side is provided, the electronic device comprises a processing circuitry configured to: group a plurality of terminal devices based on data configuration characteristics of the plurality of terminal devices; determine a contention window for each group; and notify each of the plurality of terminal devices of the contention window associated therewith, such that each of the terminal devices is able to perform data transmission within the respective contention window in a contention-based manner.

15 Claims, 15 Drawing Sheets

(51) Int. Cl.
*H04W 72/566* (2023.01)
*H04W 74/00* (2009.01)

(56) References Cited

U.S. PATENT DOCUMENTS

| | | |
|---|---|---|
| 2014/0023053 A1 | 1/2014 | Park et al. |
| 2016/0345326 A1 | 11/2016 | Yerramalli et al. |
| 2017/0019909 A1* | 1/2017 | Si .................... H04W 16/14 |
| 2017/0079054 A1 | 3/2017 | Yan et al. |
| 2017/0288817 A1* | 10/2017 | Cao ...................... H04L 1/1812 |
| 2017/0347378 A1* | 11/2017 | Le-Ngoc ........... H04W 72/0446 |
| 2018/0176955 A1 | 6/2018 | Salem et al. |
| 2019/0045489 A1 | 2/2019 | He et al. |
| 2019/0200404 A1 | 6/2019 | Yu et al. |
| 2020/0259621 A1 | 8/2020 | Oh et al. |
| 2020/0296735 A1* | 9/2020 | Makki ................... H04W 72/12 |
| 2020/0413442 A1 | 12/2020 | Balasubramanian et al. |
| 2021/0036818 A1* | 2/2021 | Eldessoki ............. H04L 5/0037 |

FOREIGN PATENT DOCUMENTS

| | | |
|---|---|---|
| CN | 103069906 A | 4/2013 |
| CN | 103069914 A | 4/2013 |
| CN | 103596273 A | 2/2014 |
| CN | 106488565 A | 3/2017 |
| CN | 107615843 A | 1/2018 |
| CN | 107710846 A | 2/2018 |
| CN | 107852752 A | 3/2018 |
| KR | 20170054218 A | 5/2017 |
| WO | 2016/177137 A1 | 11/2016 |

OTHER PUBLICATIONS

ETSI, "Study on Scenarios and Requirements for Next Generation Access Technologies", 3GPP TR 38.913 Version 14.2.0 Release 14, ETSI TR 138 913, V14.2.0, May 2017, pp. 1-40.
First Office Action mailed on Jul. 21, 2023, received for CN Application 201980038228.0, 21 pages including English Translation.

* cited by examiner

ELECTRONIC DEVICE, COMMUNICATION METHOD AND STORAGE MEDIUM

CROSS-REFERENCE TO RELATED APPLICATIONS

The present application is a continuation of U.S. application Ser. No. 17/056,428, filed Nov. 18, 2020, which is based on PCT filing PCT/CN2019/090572, filed Jun. 10, 2019, which claims priority to CN 201810616425.3, filed Jun. 15, 2018, the entire contents of each are incorporated herein by reference.

FIELD OF THE INVENTION

The present disclosure relates to electronic devices, communication methods, and storage media, and more particularly, the present disclosure relates to electronic devices, communication methods, and storage media for contention-based uplink transmission in a wireless communication system.

DESCRIPTION OF THE RELATED ART

Benefiting from the development of wireless communication technology, many application services are increasingly popular. Depdning on different types of services, requirements on wireless communication differ. For example, in Non-Patent Literature 1 (Xu Xiaodong et al. "Study on Scenarios and Requirements for Next Generation Access Technologies", 3GPP TR 38.913), three important application scenarios are considered for the 5G communication system: Enhanced Mobile Broadband (eMBB), massive Machine Type Communication (mMTC), Ultra-Reliable Low-Latency Communication (URLLC). Among them, URLLC focuses more on latency and reliability, in addition to meeting traditional requirements (such as the peak data rate and the peak spectral efficiency). URLLC is expected to be used in scenarios sensitive to latency and reliability, such as enhanced vehicle-to-vehicle (V2X), factory automation, peer-to-peer communication (P2P), wireless sensor network (WSN), etc.

Non-Patent Literature 1 also proposes specific requirements on latency and reliability in the URLLC scenario. Specifically, the latency in the control plane does not exceed 10 ms, the latency in the user plane does not exceed 1 ms (wherein it does not exceed 0.5 ms for uplink, and does not exceed 0.5 ms for downlink), and the reliability is not less than $1-10^{-5}$ (The packet length is 32 bytes). This requires key designs in areas such as core network deployment, physical layer, media access control (MAC) layer and the like.

Explanation is made below by taking factory automation as an example. FIG. 1 illustrates the application of URLLC in the factory automation scenario. In this scenario, one control device and several terminal devices are regularly distributed in a space within a range of tens of meters, which is generally called an automation cell. The terminal devices constitute a streamline in the factory, include sensors, actuators and the like, and are used to implement the main process flow. Although only terminal devices UE1 to UE6 are shown schematically in FIG. 1, the actual number is much larger. The main control unit BS constitutes a communication and control center of the automation cell, and it communicates with various terminal devices and performs information interaction therewith. For example, the sensors transmit environmental information to the main control unit BS, and the main control unit BS issues control commands to the actuators based on a certain strategy to complete certain operations. For productivity reasons, data transmission needs to be completed in a very short time (for example, 1 ms). Assuming that the transmission at the physical layer can be completed within 100 μs, it is desirable that the data latency at the MAC layer will be, for example, 0.3 ms for uplink and 0.5 ms for downlink, and it is desirable that the data transmission has a high reliability.

This poses a challenge to the transmission scheduling at the MAC layer. Since the terminal devices in the automation cell are of a large number and have a dense distribution, and the real-time data traffic is generated under a real-time control of the interconnected sensors and actuators, it is difficult to determine the exact sequence of packets generated by different terminal devices, so the data transmission in the uplink direction is characterized in intensity, bursty, short packets and so on. In this case, traditional uplink transmission scheduling scheme cannot meet the requirements. Strategy for static scheduling or semi-static scheduling will be frequently updated, which will consume a part of resources. Dynamic scheduling will consume a lot of signaling overhead. In addition, traditional signaling transmission method also has some disadvantages in the URLLC scenario. In the traditional transmission, the signaling may utilize a sub-optimal coding scheme (eg, repeated coding). However, this will affect the reliability of data transmission, because a successful transmission of data is based on the correct transmission of these control information.

Therefore, there is a need for an uplink transmission scheme that can satisfy both constraints of low latency and high reliability.

SUMMARY OF THE INVENTION

Aspects are provided by the present disclosure to satisfy the above-mentioned need.

One aspect of the present disclosure provides an electronic device on control device side, comprising a processing circuitry configured to: group a plurality of terminal devices based on data configuration characteristics of the plurality of terminal devices; determine a contention window for each group; and notify each of the plurality of terminal devices of the contention window associated therewith, such that each of the terminal devices is able to perform data transmission within the respective contention window in a contention-based manner.

Another aspect of the present disclosure provides an electronic device on terminal device side, comprising a processing circuitry configured to: receive information on a contention window allocated to the terminal device from a control device, wherein the contention window is determined by the control device based on data configuration characteristics of a plurality of terminal devices including the terminal device; and perform data transmission within the respective contention window in a contention-based manner.

Yet another aspect of the present disclosure provides a communication method, comprising: grouping a plurality of terminal devices based on data configuration characteristics of the plurality of terminal devices; determining a contention window for each group; and notifying each of the plurality of terminal devices of the contention window associated therewith, such that each of the terminal devices is able to perform data transmission within the respective contention window in a contention-based manner.

Yet another aspect of the present disclosure provides a communication method, comprising: receiving information on a contention window allocated to the terminal device from a control device, wherein the contention window is determined by the control device based on data configuration characteristics of a plurality of terminal devices including the terminal device; and performing data transmission within the respective contention window in a contention-based manner.

Yet another aspect of the present disclosure provides a non-transitory computer readable storage medium storing executable instructions which, when executed, perform any communication method as described above.

Still yet another aspect of the present disclosure provides an electronic device on control device side, comprising a processing circuitry configured to: receive data transmitted simulatenously by at least two terminal devices in the same contention window in a contention-based manner; and send a retransmission request to a portion of the at least two terminal devices in response to determining that the data cannot be decoded.

According to one or more aspects of the present disclosure, the uplink transmission that has a low latency and high reliability can be achieved.

BRIEF DESCRIPTION OF THE DRAWINGS

A better understanding of the present disclosure may be achieved by referring to a detailed description given hereinafter in connection with accompanying figures, where the same or similar reference signs are used to indicate the same or similar components throughout the drawings. The drawings are included in the specification and form a part of the specification along with the following detailed descriptions, for further illustrating embodiments of the present disclosure and for explaining the theory and advantages of the present disclosure. Wherein.

Features and aspects of the present disclosure will become apparent from the following description of exemplary embodiments with reference to the attached drawings.

DESCRIPTION OF EMBODIMENTS

The illustrative embodiments of the invention will be described hereinafter with reference to the drawings. For purpose of clarity and simplicity, not all features are described in the specification. Note that, however, many settings specific to the implementations can be made in practicing the invention according to specific requirements, so as to achieve specific goals of the developers, for example, to comply with the limitations related to apparatus and service, and these limitations may vary from one implementation to another. Furthermore, it will be appreciated that the developing work will be a routine task, despite complex and tedious, for those skilled in the art who benefit from the present disclosure.

In addition, note that in order to avoid obscuring the present disclosure due to unnecessary details, the figures illustrate only steps of a process and/or components of a device that are closely related to the technical solutions of the present disclosure, and omit other details that are in little relation to the present disclosure.

Exemplary embodiments and application examples of the present disclosure will be described below with reference to the drawings. The following description of illustrative embodiments are merely exemplary and should not be regarded as any limit for the scope of the present disclosure and the applications thereof.

Figure 2:
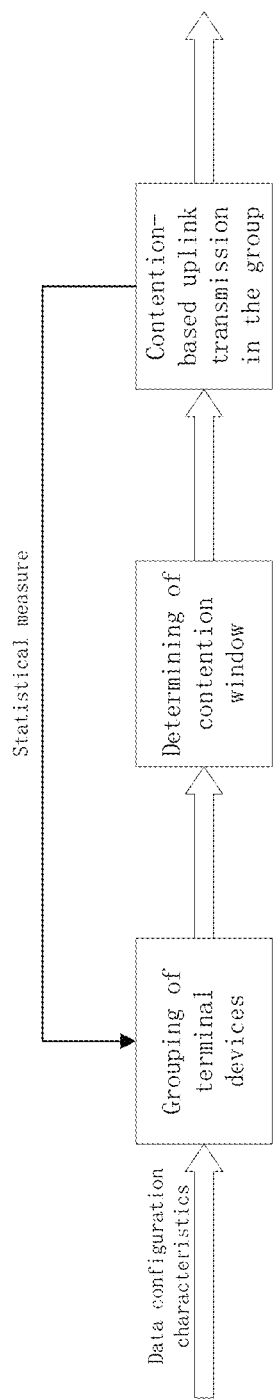
FIG. 2 shows a conceptual block diagram of a contention-based uplink transmission according to an embodiment of the present disclosure.

FIG. 2 is a conceptual block diagram illustrating the contention-based uplink transmission according to an embodiment of the present disclosure. To facilitate clear understanding, FIG. 2 shows the basic concept of the embodiment of the present disclosure in the simplest way, while omitting other details required for practice.

As is well known in the art, "uplink transmission" occurs in the direction of the link from a terminal device to a control device.

The term "control device" used in this disclosure refers to a device located on the network control side of a wireless communication system or a radio system, and includes at least a wireless communication station that provides communication services for a plurality of terminal devices, and has a full breadth of it common meaning. As an example, the control device may be a base station such as an eNB of the 4G communication standard and a gNB of the 5G communication standard, a main control unit in an automation factory, a remote radio head, a wireless access point, a drone control tower, or a communication device or a part thereof that performs the similar functions. Application examples of the base station will be described in detail in the following sections.

The term "terminal device" used in the present disclosure is a device located on the user side of a wireless communication system or a radio system, and has a full breadth of its common meaning. The terminal device is sometimes referred to herein as a user, user equipment, or UE. As an example, the terminal device may be a movable device, such as a mobile phone, a laptop computer, a tablet computer, in-vehicle communication device, etc., or an unmovable device, such as a sensor or an actuator in a factory, etc. Application examples of the terminal device will be described in detail in the following sections.

As shown in FIG. 2, first, the control device groups a plurality of terminal devices that communicate with it. The control device acquires data configuration characteristics of the plurality of terminal devices, and divides the se terminal devices into two or more terminal device groups according to the data configuration characteristics. After the grouping, the control device may perform the MAC-layer scheduling on basis of group (a terminal device group), such as allocations of contention windows and transmission resources, which will be described later. When the data configuration characteristics of a terminal device change, the control device may regroup based on the changed data configuration characteristics.

Then, the control device determines a contention window for each terminal device group. The "contention window" in this disclosure refers to a time window in which the terminal devices in the respective group can perform uplink data transmission with the control device. Different from the "transmission resources" (such as physical resource blocks PRB s) which will be described later, the contention window has a larger time granularity, and the transmission resources allocated by the control device to each terminal device group fall within the respective contention window.

After determining the contention window for each group, the control device may notify each of the terminal devices of the contention window for the group to which the terminal device belongs. In this way, each of the terminal devices will know its contention window in which it can perform the uplink data transmission, and can use available transmission resources for uplink data transmission in the contention window when it has data to be transmitted to the control device. According to an embodiment of the present disclosure, the terminal devices in each group perform data transmission in a contention-based manner, that is, the contention-based data transmission. Specifically, the control device allocates, to each group, transmission resources shared by all of the terminal devices in the group, and any of the terminal device can use the shared transmission resource to initiate a data transmission at a time point within the contention window. When two or more terminal devices in the same group transmit data at the same time, a transmission collision may occur. The control device uses a predetermined collision decision to solve the collision.

In addition, the control device can also use a feedback mechanism to adjust the grouping of the terminal devices to optimize the overall transmission performance. As shown in FIG. 2, the control device collects a statistical measure of the data transmission of each of the terminal devices over a time period, and optimizes the grouping based on the statistical measure.

Exemplary implementation details of the contention-based uplink data transmission as shown in FIG. 2 will be described in detail below.

1. Grouping of the Terminal Devices

According to an embodiment of the present disclosure, the control device groups a plurality of terminal devices with which it communicates, and performs a transmission scheduling at the MAC layer on the basis of group. The grouped plurality of terminal devices may be all terminal devices that communicate with the control device, or may be a part of the terminal devices selected as needed. As a result of the grouping, the plurality of terminal devices are divided into two or more terminal device groups, where each of the terminal device groups includes at least one terminal device. The "grouping" mentioned in the present disclosure is a grouping in a logical sense, that is, the plurality of terminal devices are divided into several subsets with or without intersection.

The grouping of the terminal devices may be based on the data configuration characteristics of the terminal devices.

The data configuration characteristics may refer to characteristic information related to the configuration (i.e., data pattern) of generation and transmission of data. For example, the data configuration characteristics may include one or more of: characteristics related to the generation of data, such as an ID of a terminal device that has generated the data, a location or geographic information of the terminal device, identification information (such as a serial number) on a process in which the terminal device participates or on an operation performed by the terminal device when generating the data, a period of generating data, a rate of generating rate, data volume, etc.; characteristics related to the form of data, such as a length of a packet; characteristics related to the transmission requirements of data, such as a transmission frequency, a latency constraint, a reliability constraint, a quality of service constraint, etc. The data configuration characteristic may also be other characteristic information capable of characterizing the data pattern of the terminal device.

The types of data configuration characteristics used by the control device may vary depending on the algorithm or criteria used to perform the grouping. In different application scenarios, the data configuration characteristics used by the control device may vary, and even are not limited to those described above.

Figure 3A:
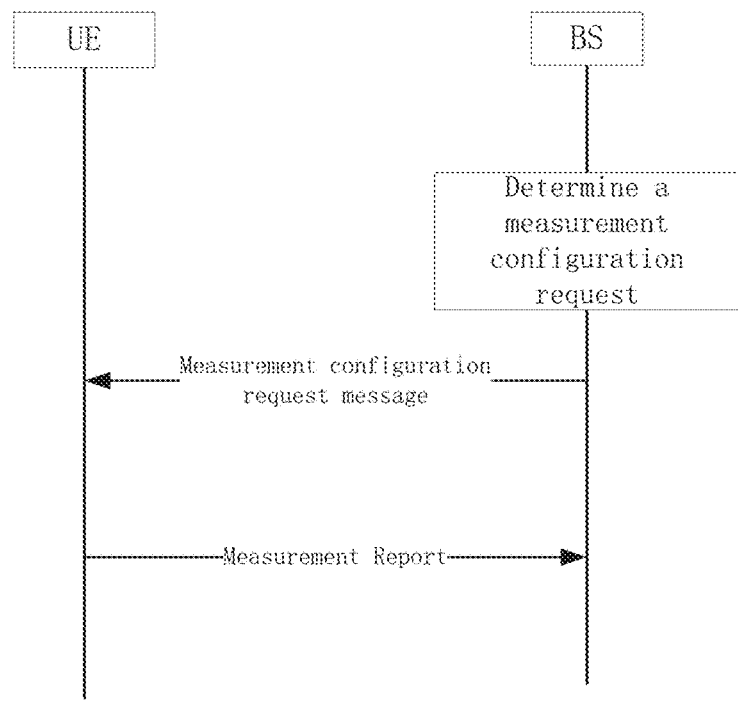
FIG. 3A illustrates a signaling flow of a control device pulling data configuration characteristics/statistical measures from terminal devices.

In one example, the control device acquires the data configuration characteristics from various terminal devices. Here, two exemplary methods for acquiring the data configuration characteristics are described with reference to FIGS. 3A and 3B. FIG. 3A illustrates a method in which the data configuration characteristics are pulled by a control device from a terminal device according to an embodiment of the present disclosure, and FIG. 3B illustrates a method in which the data configuration characteristics are pushed from a terminal device to a control device according to an embodiment of the present disclosure.

As shown in FIG. 3A, first, the control device generates a measurement configuration request to be sent to the terminal device. The measurement configuration request includes information about which data configuration characteristics the control device expects to acquire. In a preferred example, the measurement configuration request includes an index indicating a data configuration characteristic, so that a signaling overhead of the measurement configuration request message sent to the terminal device can be reduced. After receiving the measurement configuration request, the terminal device encapsulates the data configuration characteristics specified in the measurement configuration request into a measurement report and sends it to the control device. In addition, the measurement configuration request may also include a mode in which the control device expects the terminal device to feed back the data configuration characteristics, including: a periodic mode in which the terminal device periodically feeds back the latest data configuration characteristics in a frequency (such as once an hour, once a day, etc.) specified in the measurement configuration request; a single-pass mode in which the terminal device will feed back the data configuration characteristics once only after receiving the request; and a event-driven mode in which the terminal device will feed back the data configuration characteristic when a trigger event occurs (for example, the data configuration characteristic is updated, the terminal device is initialized, the communication connection is restored, etc.).

Figure 3B:
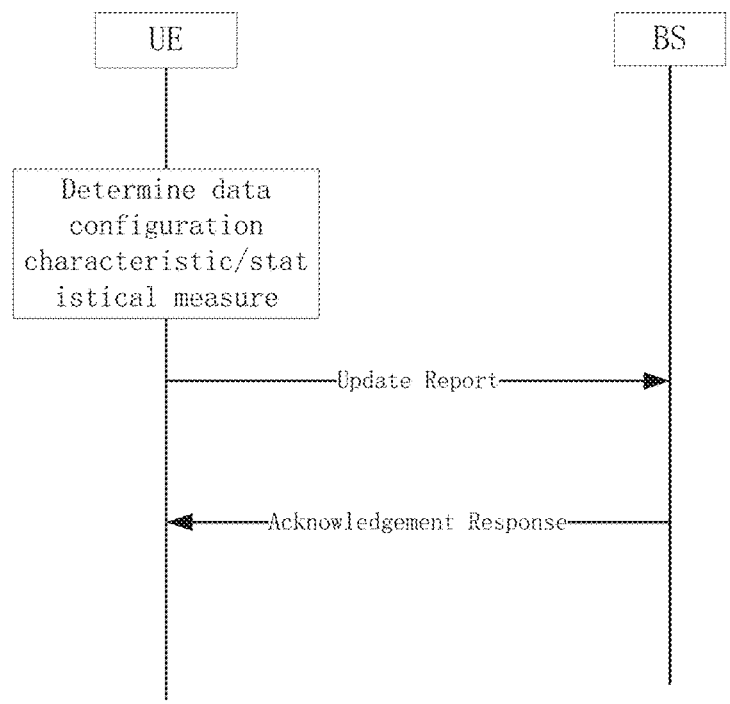
FIG. 3B illustrates a signaling flow of terminal devices pushing data configuration characteristics/statistical measures to a control device.

As shown in FIG. 3B, the terminal device sends an update report containing the latest data configuration characteristics to the control device, and after receiving the update report, the control device stores the information on the data configuration characteristics contained therein, and send an acknowledgement response to the terminal device. This process can be viewed as the terminal device actively "pushing" the data configuration characteristics. The mode in which the terminal device pushes the data configuration characteristic may include: a periodic mode in which the terminal device periodically pushes the update reports; an event-driven mode, in which the terminal device will push the data configuration characteristic when a trigger event (for example, the data configuration characteristic is updated, the terminal device is initialized, the communication connection is restored, etc.).

In another example, the control device may acquire the data configuration characteristics from a third-party device. For example, a management system of the terminal devices may have a database that stores various information related to the terminal devices. The data configuration characteristics of each of the terminal devices can be stored or backed up in this database along with other configuration information. In this case, the control device can acquire the data configuration characteristics of each of the terminal devices from the database via the application layer (for example, a database application, a web application, etc.) without acquiring from the terminal devices.

After acquiring the data configuration characteristics of each of the terminal devices, the control device determines the grouping of the terminal devices according to various algorithms or criteria. The control device performs the uplink transmission scheduling on the basis of group, and all terminal devices in the group will be allowed to perform the data transmission in a contention-based manner. In other words, the control device determines which of the terminal devices are to compete with each other for data transmission.

When performing the grouping, the control device mainly considers two compromises: on one hand, the terminal devices in each group can make full use of the transmission resources allocated to the group as much as possible to improve the efficiency of resource usage; one the other hand, the terminal devices in each group meet the transmission requirements concerning latency and reliability.

Considering that the data configuration characteristics actually characterize the pattern in which the terminal device generates and transmits data, the control device can consider the mutual relationship between the plurality of terminal devices from the perspective of the data pattern.

In one example, the control device determines the dependencies among the terminal devices as a critical metric for the grouping. The dependencies among the terminal devices may include, for example, a temporal dependency, a spatial dependency, a process dependency, a causal dependency, and so on.

Example dependencies among the terminal devices will be explained by taking the scenario of factory automation as an example. It should be understood that the dependencies in different application scenarios may be different, and one or more dependencies may be selected for the grouping.

Figure 1:
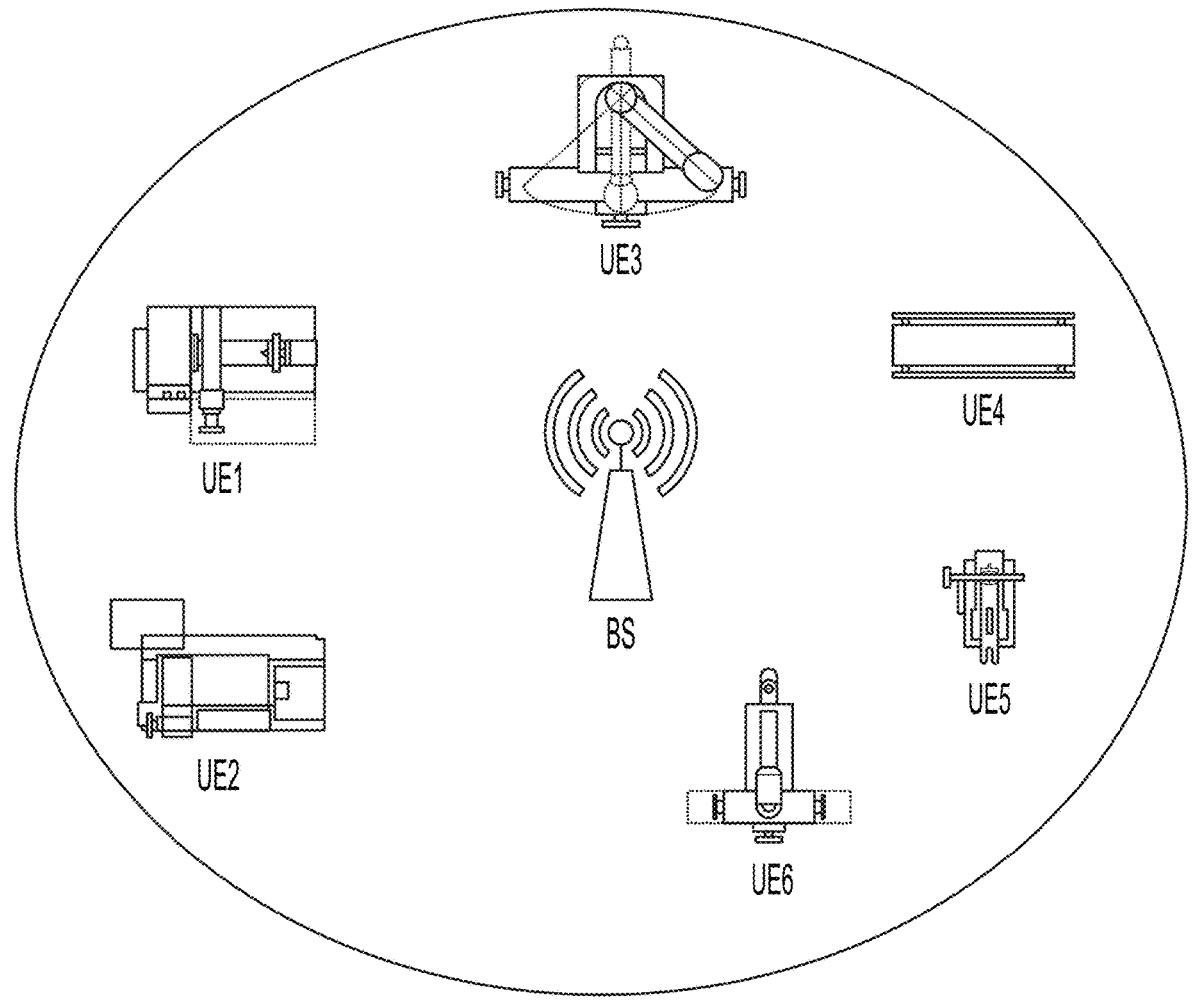
FIG. 1 illustrates an exemplary communication scenario of the factory automation.

In the scenario of factory automation, a production line can employ various types of layouts, such as a project layout, a streamline layout, a cluster layout, or a mixed layout. The production line can be composed of several production units, each of which is responsible for a part of the entire production process. Terminal devices such as sensors and actuators (such as UE1 to UE6 shown in FIG. 1) are installed at appropriate locations on the production line according to the process flow. The functions of the production units are automatically and interlinkedly achieved by these terminal devices under control of the control device (such as the BS shown in FIG. 1). When the production line or production unit is operating normally, each terminal device performs operations according to pre-configurations and control commands from the control device. For example, a sensor performs operations such as detection and measurement, and generates resulting data. The sensor reports the generated data to the control device BS, so that the control device BS can learn the operational status and environmental information of the production line or production unit. The control device BS can then generate a control command and send it to an actuator. The actuator performs various operations according to pre-configurations or control commands. The actuator can also generate data such as an execution result, an execution status, an execution error or the like, and feed it back to the control device BS.

In such a system, from the perspective of data generation and transmission modes, various dependencies may be exhibited among the terminal devices. The dependency index concerned by the control device may be associated with the selected data configuration characteristics. The control device can evaluate the dependencies by analyzing the data configuration characteristics:

1) Terminal devices deployed in adjacent locations tend to have a spatial dependency. The control device evaluates the spatial dependency based on the location or geographic information of the terminal devices. In a case where the wireless communication system employs beamforming, terminal devices with high spatial dependency can share the same space-domain resources;

2) Terminal devices performing adjacent or similar processes may have a temporal dependency. Based on the IDs of terminal devices, the processes they participate in, the operations they perform or the like, the control device evaluates the time interval and sequence of data generated by each of the terminal devices. In one example, the control device may evaluate such temporal dependency by, for example, calculating a dispersion in time;

3) Terminal devices that belong to the same generation unit usually have a dependency in process. According to the IDs of terminal devices, the processes they participate in, the operations they perform or the like, the control device evaluates such process dependency;

4) If an operation performed by one terminal device depends on data generated by another terminal device, for example, an operation of an actuator depends on measurement data of a sensor, then there is a causal dependency among the two terminal devices.

The control device may selectively evaluate the dependencies. There are various methods for evaluating the dependencies, such as a qualitative method for simply evaluating subordination or the like, or a quantitative method for evaluating a correlation coefficient, a dispersion or the like.

Based on the evaluated dependencies, the control device clusters the terminal devices. Typically, the control device can group terminal devices with a high dependency into the same terminal device group. The control device can also quantify the dependency and group the terminal devices with dependencies higher than a predetermined threshold into the same group.

In a case of considering multiple dependencies, the control device may perform grouping of the terminal devices by means of a weighting of the dependencies, an Euclidean distance in the space of dependencies, and so on.

In another example, the control device may determine the service priority of each of the terminal device as a critical metric for grouping. The service priority may be indicated by a service quality category indicator (QCI). The service priority may also take latency constraint and reliability constraint of data transmission into account. For example, a terminal device that requires a lower transmission latency and a higher reliability may have a higher service priority. The control device avoids grouping terminal devices with a high service priority (for example, a service priority higher than a predetermined threshold) into the same group to prevent data transmissions of the terminal devices with a high service priority from affecting each other due to competition. If necessary, a terminal device with a high service priority can be individually grouped to ensure a prioritized transmission of the terminal device.

During the grouping by the control device, factors such as the channel state can also be taken into consideration by the control device. Based on channel state information (CSI) from terminal devices, the control device can group the terminal devices with similar channel states into the same group. The control device can also avoid concentrating too many terminal devices with poor channel states in the same group.

In an example, if a certain terminal device needs to transmit with a high frequency and a large amount of data, the control device may group the terminal device into multiple groups. Thus, the terminal device will be able to use multiple contention windows for data transmission.

Although the examples in which the control device performs the grouping based on the dependency among the terminal device, the service priority, or the channel state are described separately above, the control device may also consider various critical metrics comprehensively.

The control device may also directly take the data configuration characteristics as input, and perform the grouping of terminal devices through various clustering or classification methods such as the k-nearest neighbor, the decision tree, SVM, or the like.

Generally speaking, given the total number of the terminal devices, on one hand, the fewer the groups are, the more the number of terminal devices in a single group is, and the fiercer the competition in the group is, the resource use efficiency is high, but there is a large pressure to meet the latency constraint and reliability constraint. On the other hand, the more the groups are, the less the number of terminal devices in a single group is, and the transmission scheduling is more complicated although the competition within the group is not fierce. The control device can continuously adjust the packets to optimize the overall transmission performance.

In an example, when a new terminal device is put into use, when the data configuration characteristics of a terminal device change, and when the channel state of a terminal device changes, the control device can learn about such change from the terminal device or a third-party device, and a regrouping may be performed by using the grouping process as described above based on the changed data configuration characteristics, channel state or the like.

In one example, the control device may employ a feedback mechanism to adjust the grouping. For example, as shown in FIG. 2, the control device may collect a statistical measure of data transmission of each terminal device over a time period, such as a transmission success rate of packets, an average transmission time of packet, or other statistical measures.

Among them, the transmission success rate of packets can be defined as the number of packets successfully received and decoded by a terminal device under the latency constraint within a time period (for example, between two collections of the statistical measure by the control device), and characterizes the reliability of data transmission under the current grouping. For example, each terminal device can set a counter to count the total number of packets sent by the terminal device to the control device and the number of acknowledgment responses (ACK messages) received from the control device for successfully decoded packets, and then the transmission success rate of packets can be defined as:

$$\text{transmission success rate of packets} = \frac{\text{the number of successfully transmitted packets}}{\text{the total number of packets}} \times 100\%.$$

The average transmission time of packets can be defined as the average transmission time required by a terminal device to successfully transmit a packet over a time period (for example, between two collections of statistical measures by the control device), and characterizes the latency of data transmission under the current grouping. In an example, the terminal device may count up a time period from the start of transmission of a certain packet until the receipt of acknowledgement response (ACK message) of the packet as the transmission time of the packet, and calculate an average value of the transmission times of all successfully transmitted packets as the average transmission time of packets. In another example, the packets may carry information on transmission time (eg, a transmission timestamp), and the control device may calculate the transmission time of a packet by using a difference between the information on transmission time and information on the time when the control device successfully receives and decodes the packet, and obtain the average transmission time of packets by averaging over all successfully transmitted packets. In another example, the terminal device may count up the average value of number of retransmission times of all successfully transmitted packets as the average transmission time of packets.

The counter for counting the average transmission time of packets in the terminal device can update the average transmission time of packets in real time during the data transmission. For example, suppose that during the statistical time period, the average transmission time of the first N successfully transmitted packets is $T_N$, and then the transmission time of the (N+1)-th packet is measured as $G_{N+1}$, then the counter can update the average transmission time $T_{N+1}$ of these N+1 packets according to the following formula:

$$T_{N+1} = T_N + \frac{1}{N+1}(G_{N+1} - T_N).$$

The above-mentioned statistical measure obtained at the terminal device may be transmitted to the control device similarly to the data configuration characteristics.

In one example, as shown in FIG. 3A, the control device determines a measurement configuration request to be sent to the terminal device. The measurement configuration request includes information about which statistical measure the control device expects to acquire. Preferably, the measurement configuration request includes an index representing the statistical measure. After receiving the measurement configuration request, the terminal device counts up the statistical measure over a specific time period (for example, from the last feedback of the statistical measure to now, or a time period specified in the measurement configuration request), such as the transmission success rate of packets or the average transmission time of packets, encapsulates the statistical measure into a measurement report and send it to the control device. In addition, the measurement configuration request may also include a mode in which the control device expects the terminal device to feed back the statistical measure, including: a periodic mode, in which the terminal device will periodically feed back the latest statistical measure in a frequency specified in the measurement configuration request (e.g., once an hour, once a day, etc.); a single-pass mode, in which the terminal device will feed back the statistical measure once only after receiving the request; an event-driven mode, in which the terminal device will feed back the statistical measure when a trigger event occurs.

In another example, as shown in FIG. 3B, the terminal device sends an update report containing the latest statistical measure to the control device, and the control device receives the update report and sends an acknowledgement response to the terminal device. This process can be viewed as the terminal device actively "pushing" the statistical measure. The mode in which the terminal device pushes the statistical measure may include: a periodic mode, in which the terminal device regularly pushes update reports; an event-driven mode, in which the terminal device will push the statistical measure when a trigger event occurs.

The control device analyzes the latency and/or reliability of the data transmission under the current grouping of the terminal devices based on the acquired statistical measure. Based on the statistical measure of each terminal device, the control device determines whether the transmission requirement of each terminal device are met or not, for example, by comparing the statistical measure with the transmission requirement of the terminal device (such as the latency requirement, the reliability requirement, etc.), and determines whether the grouping needs to be adjusted.

In an example, if the statistical measure of a certain terminal device indicates that the latency and/or reliability of the uplink data transmission of the terminal device is not satisfactory, the control device may adjust the grouping by employing various strategies. For example, the terminal device is moved to a less competitive group based on its data configuration characteristics, for example, a terminal device group with an adjacent contention windows and a good latency condition and/or reliability condition. For another example, the control device reduces the number of terminal devices in the group where the terminal device is located. For another example, the control device may even create a new group for the terminal device. For another example, the control device may extend the contention window for the group or allocate more transmission resources to the group.

In another example, if the control device finds that the latency and/or reliability of the uplink data transmission of many terminal devices cannot meet the requirements based on the statistical measure and the problem cannot be solved by fine-tuning the grouping, the control device may regroup in accordance with the grouping process as described above. As an example, the control device may perform the grouping by employing a different grouping algorithm/criterion from the previous grouping.

The control device can periodically acquire the statistical measures and adjust the grouping, such as once an hour, once a day, once a week, or the like. Adjusting the grouping at a high frequency can optimize the transmission performance in a timely manner, but may consume more computing and transmission resources. In the case of factory automation, the control device (such as the control device BS in FIG. 1) can collect statistical measures every night when the production line is shut down and adjust the grouping of terminal devices.

2. Determining of Contention Window

The control device determines a contention window for each terminal device group, that is, determines a time window in which the terminal devices in each group can transmit data to the control device.

In order to avoid competition between different groups, the contention windows determined by the control device for different groups may not overlap each other in the time domain, or although they overlap or coincide in the time domain, the frequency-domain resources, code-domain resources or the like used by different groups are different from each other (for example, orthogonal to each other). In this sense, "contention window" can be understood as a time window with a specific set of transmission resources.

The following will take the uplink frame structure used in 4G LTE and the frame structure used in 5G NR as examples to schematically describe a form of the contention window and the transmission resources.

Figure 4A:
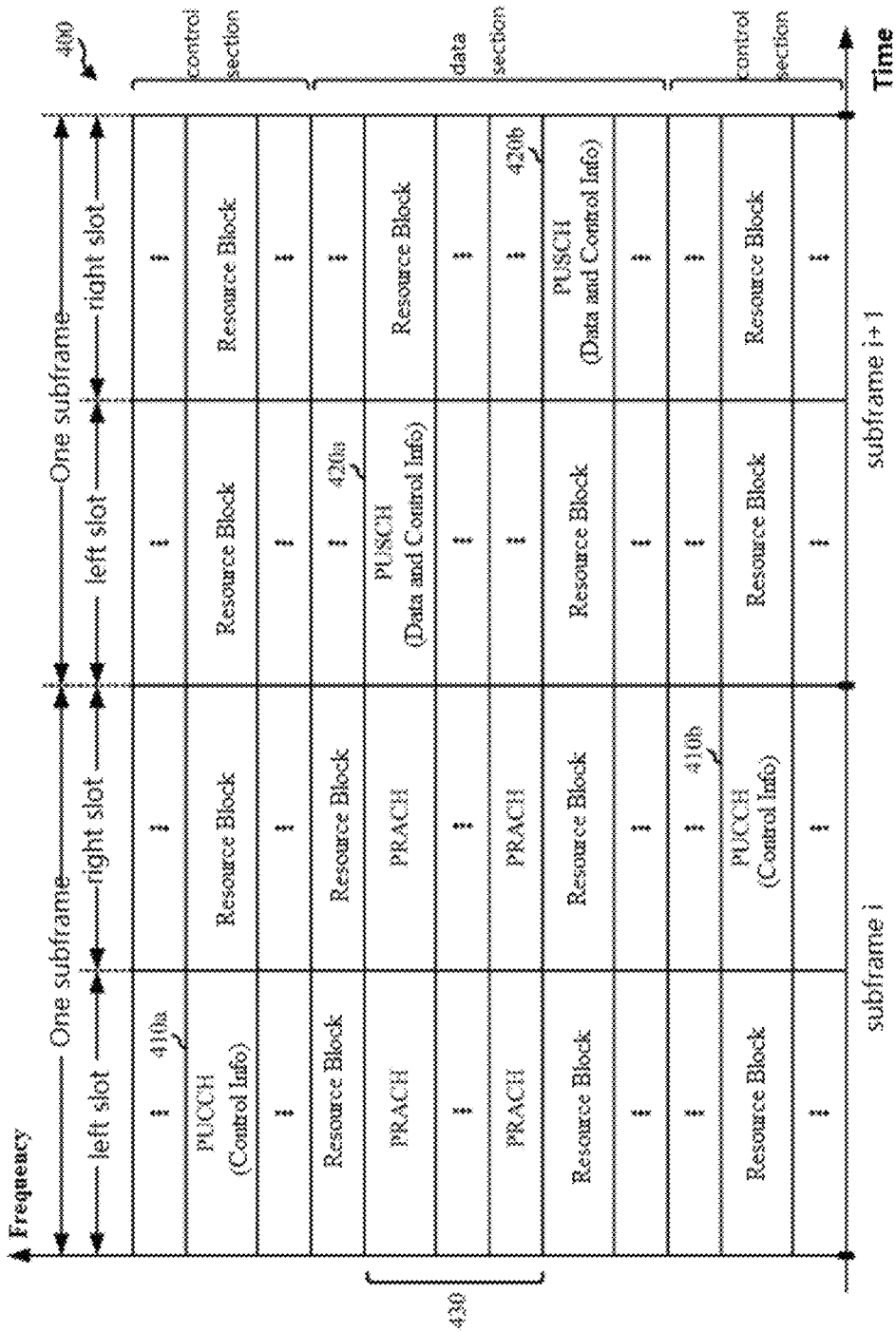
FIG. 4A is a diagram illustrating an uplink frame structure according to the 4G communication standard.

FIG. 4A illustrates a diagram 400 of the uplink frame structure in LTE. A frame of 10 ms is divided into 10 subframes of equal size. Each subframe is 1 ms and may include 2 consecutive time slots. Each slot includes several physical resource blocks (PRB). A resource grid can be used to represent the slot. In LTE, each PRB contains 12 consecutive subcarriers in the frequency domain, and contains 7 consecutive OFDM symbols in the time domain for a normal cyclic prefix in each OFDM chip, or in other words, each PRB contains 84 resource elements (RE). The PRBs available for uplink transmission may be divided into data sections and control sections. The PRBs in the control section (such as 410a, 410b) can be assigned to the terminal device for transmitting control information. The data section may include all PRBs that are not included in the control sections. The terminal device may also be assigned with PRBs in the data section (such as 410a, 410b) for transmitting data to the control device eNB. A PRB is a common unit group allocated in LTE.

Figure 4B:
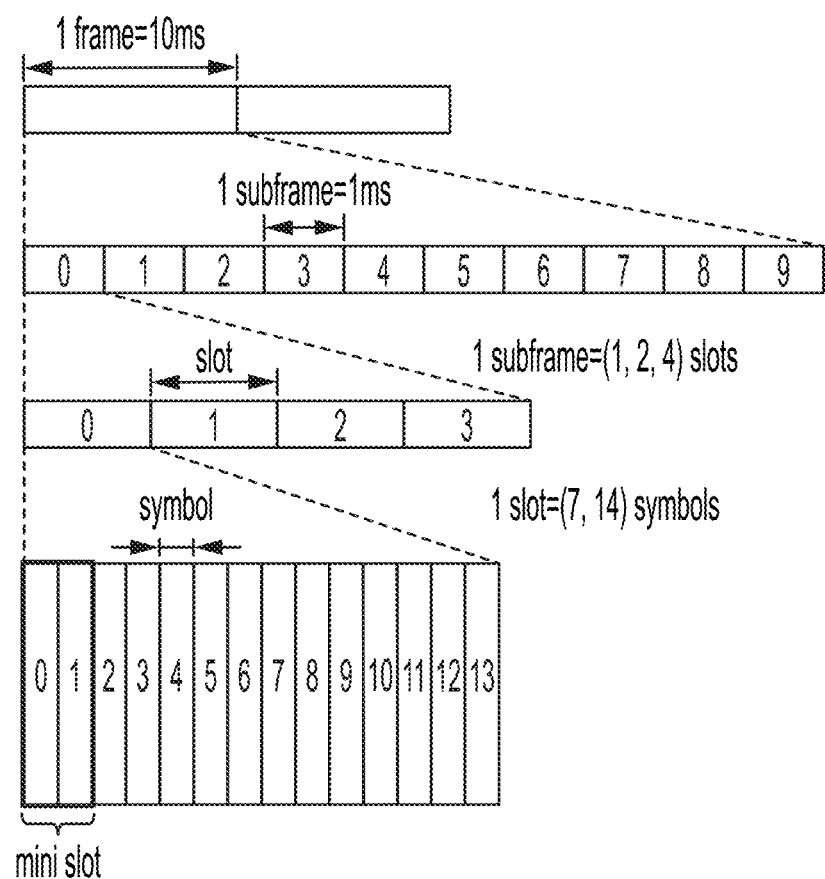
FIG. 4B is a diagram illustrating an uplink frame structure according to the 5G communication standard.

FIG. 4B shows a diagram of an uplink frame structure in a 5G communication system. As a fixed architecture compatible with LTE, the frame (10 ms) in 5G NR also includes 10 subframes of equal size. The difference is that the frame structure in NR has a flexible architecture depending on subcarrier spacing. The slots in each subframe are configurable, and the number of symbols in each slot is also configurable. NR has also proposed a concept of mini-slot for URLLC.

Depending on the scheduling configuration of the wireless communication system, the contention window may be of various granularities. According to an embodiment of the present disclosure, the contention window may be a time window associated with one or more consecutive frames, subframes, slots, mini slots, and so on. Correspondingly, the transmission resources allocated to each group may be physical resource blocks, resource elements or the like with a granularity smaller than that of the contention window. Transmission resources may also include resources in the power domain.

In one example, the contention windows assigned by the control device to each terminal device group may have an equal size, which will simplify the complexity of resource scheduling. In another example, the control device may assign contention windows of different sizes to different groups.

In one example, the contention window assigned by the control device to each terminal device group may be periodic until the grouping of the terminal devices is changed or the contention window is determined again. In this way, the control device can notify a terminal device of the contention window associated with it only once, which will reduce the overhead of signaling transmission.

The contention window determined by the control device for each terminal device group matches the data pattern of the terminal devices in the group. For example, a contention window is a time period in which time points when the terminal devices in a group want to send data are generally concentrated, and the span of the contention window is sufficient to allow all or most of the terminal devices to complete their data transmission. The control device takes the contention windows for all groups into overall considerations, so as to avoid the interference between the data transmissions of various groups to the greatest extent.

After determining the contention window of each group, the control device may notify each of the terminal devices of the contention window for the group where the terminal device is in. The notification of the contention window may be performed on a physical layer control channel such as PDCCH, or may be performed on a higher layer signaling such as MAC-layer signaling, RRC (Radio Resource Control) signaling, or the like.

The control device can then allocate transmission resources to each group. The transmission resources of different groups may be the same. However, for terminal device groups with overlapped contention windows, their transmission resources are orthogonal to each other to avoid interference between groups. The transmission resources are, for example, a set of physical resource blocks or resource elements. The transmission resource matches the data pattern of each group. The control device sends resource allocation information to the terminal devices in each group via a control channel (such as PDCCH, MAC control elements, and RRC reconfiguration messages).

Although the determination of the contention window and the allocation of the transmission resources are described separately above, in one example, the operation of determining and notifying the contention window by the control device may be implicitly included in the operation of allocating and notifying the transmission resources. Specifically, when the control device allocates a set of transmission resources within a specific temporal range to a terminal device group, such as several PRBs spanning one or more slots, since the time window available for the terminal devices in the group to transmit data is within the temporal range, it can be considered that the contention window has been determined for the terminal device group. In other words, the contention window can be embodied by the set of allocated transmission resources.

3. Contention-Based Uplink Transmission

Each of the terminal devices receives the information on the contention window corresponding thereto, and uses available transmission resources to perform uplink data transmission within the contention window. Unlike the contention-based random access process in the prior art, the terminal device does not need to send a random access preamble (i.e., Msg1) to the control device, but directly performs the uplink data transmission to reduce the time delay (for example, it directly transmits Msg3 as in the traditional random access process. Msg3 is transmitted via the uplink shared channel (UL-SCH) and contains the cell radio network temporary identifier MAC control element (C-RNTI MAC CE) or common control channel service data unit (CCCH SDU) related to the UE Contention Resolution Identity submitted from the upper layer).

According to an embodiment of the present disclosure, the terminal devices perform data transmission in a contention-based manner. The control device allocates transmission resources, such as time-frequency resources, code domain resources, transmission power, and other resource elements used for transmission, on the basis of group. These transmission resources are shared by all terminal devices in the group.

If a terminal device has data that needs uplink transmission, it will randomly select a time point within the contention window to start the transmission, but the time period from that time point to the end of the contention window is long enough to complete at least a single uplink transmission of data. Whether the terminal device decides to access or not depends on a random access factor. The random access factor indicates the user's access frequency, which is determined by the channel state, the transmission mode of the terminal device, and the user's reliability requirement and latency requirement. In addition, the terminal device also determines the transmission power for transmission, for example, the power previously allocated by the control device.

Since the terminal devices in the group use common transmission resources for the uplink transmission, there may be a case that two or more terminal devices perform transmission at the same time, resulting in a collision. The control device receives the mixed signal and manages such collisions through a collision decision (such as the collision decision described in detail below). In a case where the mixed signal is successfully decoded, the control device obtains the data transmitted by each of the terminal devices.

4. Collision Management

The control device may recover packets transmitted by a terminal device by decoding the received transmission signal.

However, there are cases in which time periods of uplink transmission of at least two terminal devices in the same group are overlapped. In other words, in the overlapped time period, the at least two terminal devices share transmission resources and perform data transmission simultaneously. The transmission signals of these terminal devices are superimposed on each other in the channel, so that the control device will receive a mixed signal. This leads to a transmission collision.

According to a preferred embodiment of the present disclosure, the transmission collision is solved by utilizing non-orthogonal multiple access (NOMA) technology. Channel transmission of NOMA still uses Orthogonal Frequency Division Multiplexing (OFDM) or Discrete Fourier Transform Orthogonal Frequency Division Multiplexing (DFT-S-OFDM) technology, but transmission resources (such as time-domain or frequency-domain resources) in a frequency sub-band are no longer allocated to only one terminal device, but are shared by multiple terminal devices to improve the spectral efficiency, the maximum number of user accesses and the data throughput. Examples of NOMA include Resource Spread Multiple Access (RSMA), Sparse Code Multiple Access (SCMA), Multi-User Shared Access (MUSA), Pattern Division Multiple Access (PDMA) and so on.

The control device also allocates a different signal power to each of the terminal devices when performing the resource scheduling, so that the transmission signal of the terminal device has different transmission energy. According to the difference in transmission energy of different terminal devices, the control device implements multi-user detection and decoding of user data by using serial interference cancellation (SIC). The basic idea of the serial interference cancellation is to use a step-by-step strategy to eliminate interference, by deciding individual signal of a terminal device in the received signal, recovering its amplitude, then removing the multiple access interference (MAI) generated by the signal of the terminal device from the received signal, and making a decision again for the remaining terminal devices, and so on, until all of the multiple access interferences are eliminated.

Thus, even if two or more terminal devices in the same group transmit data simultaneously which results in a collision, it is still possible for the control device to recover data of each of the terminal devices by using the NOMA technology to decode the received signal.

As an example of NOMA decoding, the control device allocates a different SCMA codebook to each of the terminal devices. When the terminal device wants to transmit data, the terminal device uses the SCMA encoder to perform SCMA encoding on the data. When the control device receives a transmission signal from one or more terminal devices, the control device decodes the received signal by employing an algorithm such as MPA detection.

As another example, each of the terminal devices has a non-orthogonal pattern specific to the terminal device. When the terminal device wants to transmit data, a PDMA encoder at the terminal device uses the PDMA pattern matrix to perform pattern mapping on modulation signal of the data. The control device receives transmission signals from one or more terminal devices, and employs, for example, the SIC algorithm or BP (Brief Propagation) algorithm for multi-user detection.

According to embodiments of the present disclosure, any other NOMA technology may also be employed.

Figure 5:
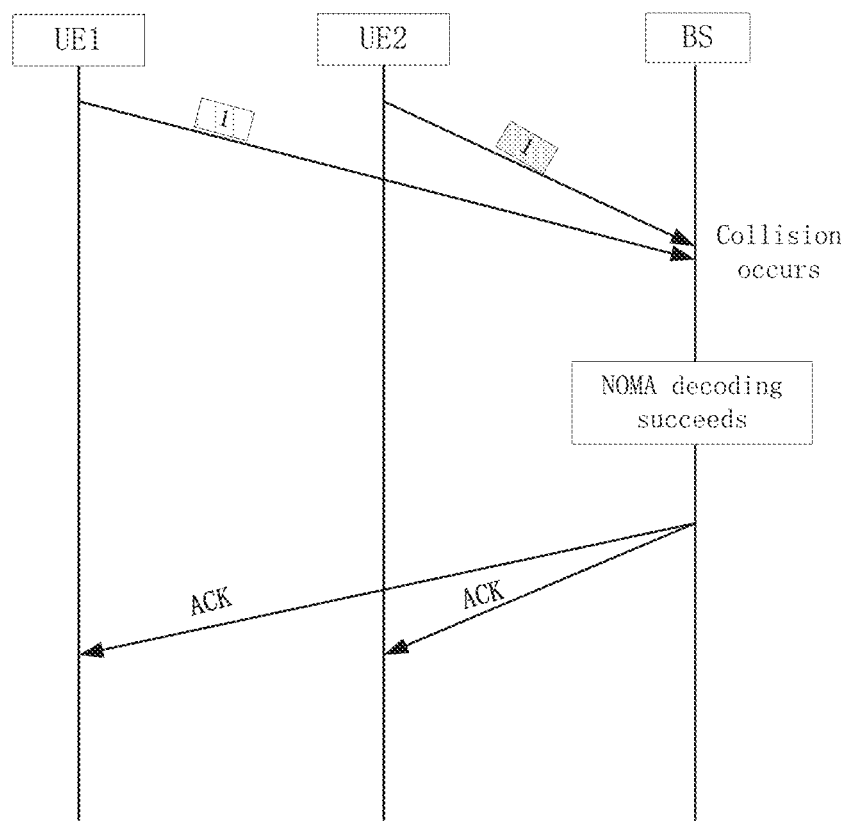
FIG. 5 is a diagram illustrating that the control device BS solves the transmission collision through NOMA decoding.

FIG. 5 illustrates a schematic diagram of managing the collision by utilizing NOMA decoding according to an embodiment of the present disclosure. As shown in FIG. 5, the terminal devices UE1 and UE2, which are grouped into the same group, transmit data simultaneously, resulting in a collision. Although only two terminal devices are shown in FIG. 5, there may be more terminal devices transmitting data simultaneously. The control device BS receives a mixed signal obtained by superimposing the transmission signal of UE1 and the transmission signal of UE2 in the channel. The control device BS performs the NOMA decoding on this mixed signal. After a successful decoding, the control device BS sends an acknowledgement response ACK (for example, containing the UE contention resolution identifier of the corresponding UE) to UE1 and UE2 to indicate the successful transmission of the packets.

When the control device cannot successfully decode the data of the terminal devices even though the NOMA technology is employed, the control device may request the terminal devices to retransmit.

Figure 6A:
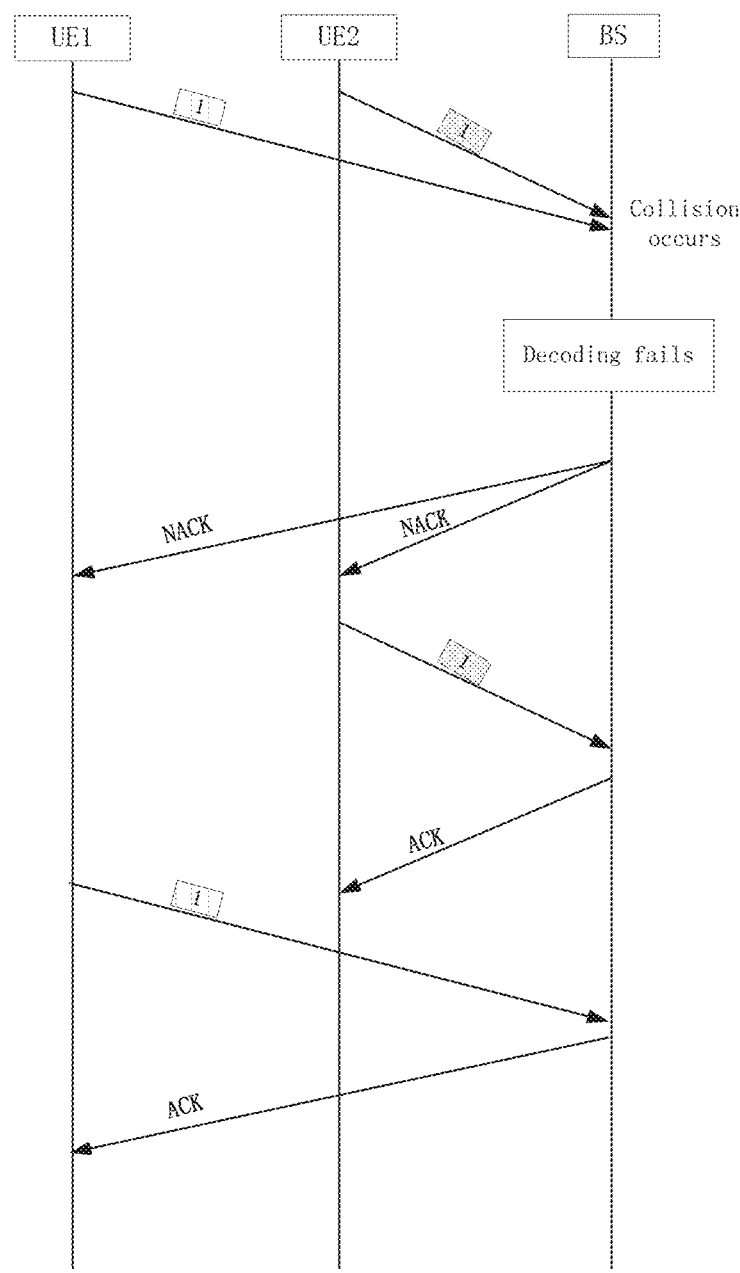
FIGS. 6A-6B illustrate examples of retransmission mechanism of the control device BS.

FIG. 6A illustrates an example of the retransmission mechanism according to an embodiment of the present disclosure. As shown in FIG. 6A, the terminal devices UE1 and UE2 that are grouped into the same group transmit data simultaneously, resulting in a collision. The control device BS decodes the mixed signal. When the decoding fails and thus the data of UE1 and UE2 cannot be recovered, the control device BS sends a retransmission request to UE1 and UE2, for example, by sending a negative response NACK indicating that the packets were not successfully received.

In one example, because the control device BS is temporarily unable to decode the data of the terminal devices, it may not be possible to know which terminal devices in the group have performed the uplink transmission, and thus cannot determine to which terminal devices the retransmission request should be sent. In this case, the control device BS may send a negative response NACK to all terminal devices in the group. A terminal device that has not previously performed the data transmission or that has performed a data transmission but has received an acknowledgement response ACK (in FIG. 6A, terminal devices other than UE1 and UE2 in the group) can ignore this NACK and do not perform a retransmission. Only the terminal devices that have just performed data transmission and have not received any response (in FIG. 6A, such as UE1 and UE2) perform a retransmission in response to receiving NACK.

In another example, the control device BS may identify which terminal devices in the group have performed the uplink transmission, for example, UE1 and UE2 that have performed the uplink transmission in the example in FIG. 6A, by an index representing the terminal device's identity (such as the transmission power, UE contention resolution identifier, or terminal device-specific packet time stamp, packet length, etc.).

As shown in FIG. 6A, the control device BS sends a NACK to the collided UE1 and UE2 to request the terminal devices to retransmit. In response to receiving the NACK, UE1 and UE2 determine that they need to retransmit the data. Here, the terminal devices may employ various retransmission methods such as a schedule-based retransmission method and a contention-based retransmission method. For example, according to the schedule-based retransmission method, the control device BS allocates mutually different transmission resources to the terminal devices UE1 and UE2 that need to be retransmit, so that UE1 and UE2 can perform the retransmission using the allocated transmission resources. For example, according to the contention-based retransmission method, the control device BS allocates a new contention window and shared transmission resources to the terminal devices UE1 and UE2 that need to retransmit, so that UE1 and UE2 can use the allocated transmission resources to perform the retransmission in a contention-based manner, for example, UE1 and UE2 can perform the retransmission using the contention-based uplink transmission according to the present disclosure.

Figure 6B:
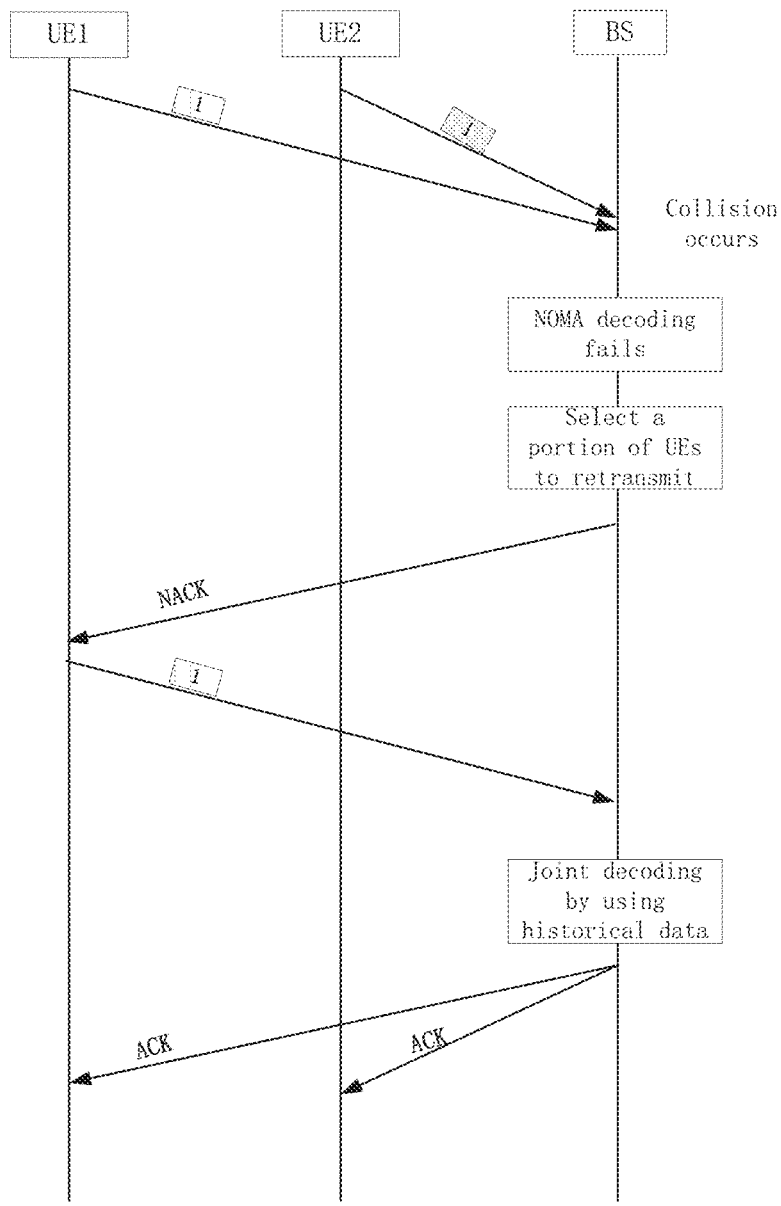

An improved retransmission mechanism according to an embodiment of the present disclosure is described here with reference to FIG. 6B.

As shown in FIG. 6B, the terminal devices UE1 and UE2 that are grouped into the same group transmit their data simulatenously, resulting in a collision. The control device BS decodes the mixed signal. When the decoding is not successful, the control device BS selects a portion of the terminal devices instead of all of the terminal devices that have encountered the transmission collision to perform the retransmission.

In order to select a terminal device that needs retransmission, the control device BS may consider factors such as the channel state, the transmission times, the transmission requirements (such as latency requirements, reliability requirements), and the service priority of the terminal device.

In one example, the selection performed by the control device BS may be based on a parameter-based strategy: For each of the terminal devices in collision, the control device BS defines a parameter based on the channel state, the transmission times, and the transmission requirements (such as latency requirements, reliability requirements), the service priority of the terminal device, the parameter reflecting the desired decoding sequence of the terminal device. The better the channel state of the terminal device is, the more the retransmission times are, the stricter the transmission requirements are, and the higher the service priority is, the value of this parameter is larger. In general, if the parameter is large, the corresponding terminal device should have a priority for decoding. The control device BS sends a retransmission request to a part of terminal devices according to a ranking of such parameters.

The control device BS also allocates transmission resources for the terminal device that is selected to retransmit, so that the terminal device can perform the retransmission using the allocated transmission resources. If more than one terminal device is selected to retransmit, the terminal device may adopt a schedule-based retransmission method or a contention-based retransmission method. According to the schedule-based retransmission method, the control device BS allocates mutually different transmission resources to the terminal device that are selected to retransmit. According to the contention-based retransmission method, the control device BS allocates contention windows and shared transmission resources to the terminal devices that are selected to retransmit, so that the terminal device can perform a contention-based uplink transmission, such as the contention-based uplink transmission according to the present disclosure.

For example, as shown in FIG. 6B, the control device BS sends a negative response NACK to only UE1 so as to request UE1 to retransmit the data. In response to receiving the NACK, UE1 retransmits the data. The control device BS receives the transmission signal from UE1 and decodes it. For the terminal device that has not been selected to retransmit, the control device BS may use historical data, that is, the signal received before the retransmission (the mixed signal of UE1 and UE2) to perform a joint decoding. For example, by removing the received signal after the retransmission (the transmission signal of UE1) from the mixed signal, the data of UE2 is decoded. Then, the control device BS sends an acknowledgement response ACK to UE1 and UE2 to indicate successful transmission. Although only two collided terminal devices are shown in FIG. 6B, similar processing may be performed when there are more than two collided terminal devices.

With the improved retransmission mechanism as described in FIG. 6B, only a portion of the collided terminal devices are required to retransmit. This can reduce the number of terminal devices that need to retransmit, and reduce the resource overhead of signaling transmission and data retransmission.

An electronic device and a communication method for implementing contention-based uplink data transmission according to an embodiment of the present disclosure will be described below.

5. Electronic Device on Control Device Side and Its Communication Method

Figure 7A:
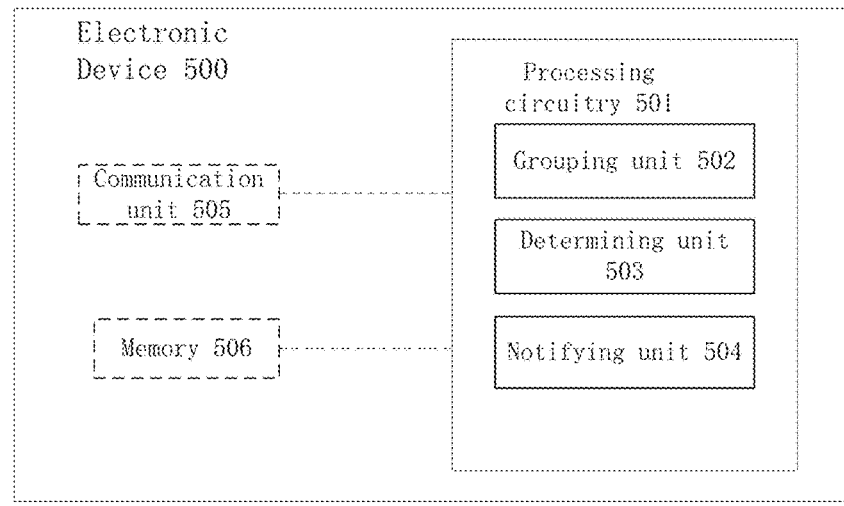
FIGS. 7A-7B illustrate an electronic device on control device side and a communication method thereof according to an embodiment of the present disclosure.

FIG. 7A is a configuration block diagram illustrating an electronic device 500 on the control device side according to the embodiment.

The electronic device 500 may communicate with a plurality of terminal devices (such as the electronic device 600 described in detail later).

Figure 7B:
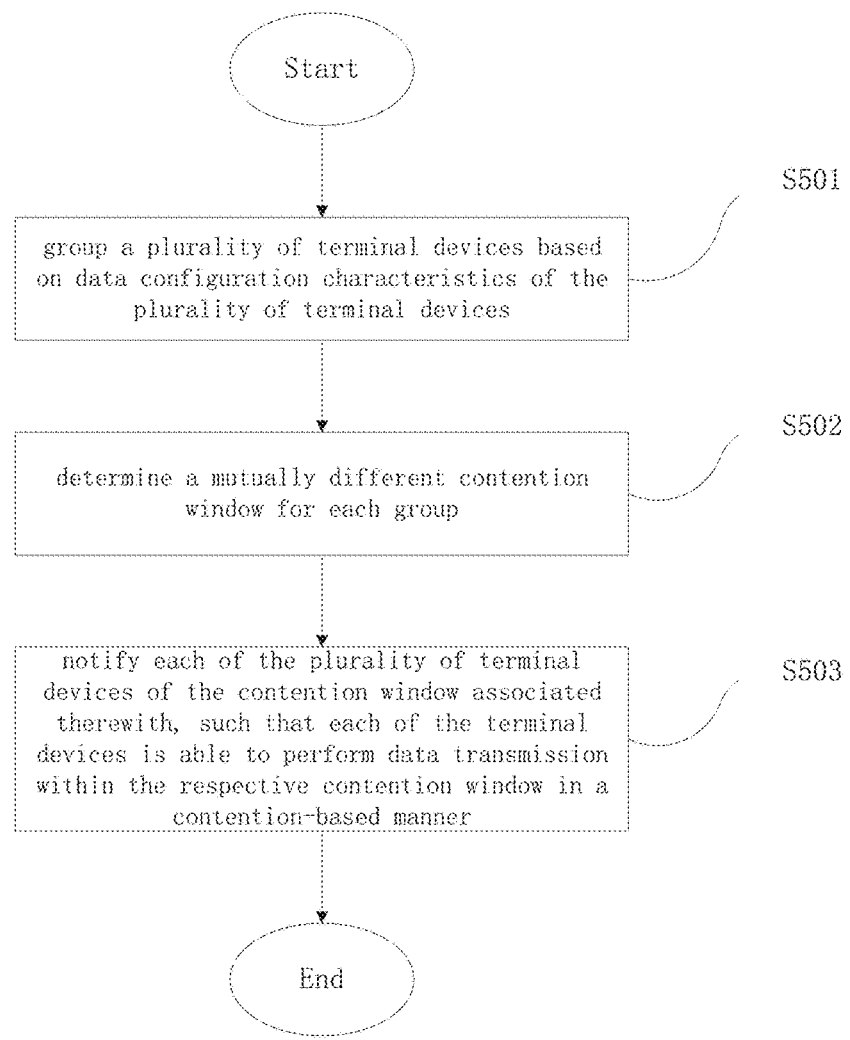

As shown in FIG. 7A, the electronic device 500 includes at least a processing circuitry 501, and the processing circuitry 501 may be at least configured to perform various steps of the communication method as shown in FIG. 7B. The processing circuitry 501 may refer to various implementations of a digital circuitry, an analog circuitry, or a circuitry for hybrid signal (a combination of analog signal and digital signal) that perform functions in a computing system. The processing circuitry may include, for example, a circuitry such as an integrated circuit (IC), an application specific integrated circuit (ASIC), a portion or circuit of an individual processor core, an entire processor core, an individual processor, a programmable hardware device such as a field programmable array (FPGA), and/or a system including multiple processors.

The processing circuitry 501 includes a grouping unit 502, a determining unit 503, and a notifying unit 504.

The grouping unit 502 is configured to group a plurality of terminal devices based on data configuration characteristics of the terminal devices (step S501 in FIG. 7B). The data configuration characteristics include: an ID of the terminal device, a location of the terminal device, identification information of a process in which the terminal device participates or an operation performed by the terminal device, a period of data generation, a length of a packet, a latency constraint of data transmission, a reliability constraint of data transmission, a service quality category index of data and the like.

The grouping unit 502 may also be configured to consider the channel states between the terminal devices and the control device when grouping the terminal devices, for example, by considering channel state information (CSI).

The grouping unit 502 is further configured to adjust the grouping of the terminal devices based on a statistical measure of data transmission of the terminal devices. The statistical measure of data transmission includes, for example, the transmission success rate of packets or the average transmission time of packets.

The determining unit 503 is configured to determine the contention window for each terminal device group (step S502 in FIG. 7B). Each contention window can be determined as one or more consecutive uplink frames, subframes, or time slots. The contention window for each group may be periodic. In a case where each group is allocated with non-orthogonal transmission resources, the contention windows for different groups are determined to not overlap in the time domain. In a case where each group is allocated with orthogonal transmission resources, the contention windows for different groups may overlap in the time domain.

The notifying unit 504 is configured to notify each terminal device of the contention window associated with it, so that each terminal device can perform data transmission within the respective contention window in a contention-based manner (step S503 in FIG. 7B). The information on the contention window may be sent by the notifying unit 504 to the corresponding terminal device in form of resource allocation information via a control channel.

In one example, the electronic device 500 may further include a decoding unit and a retransmitting unit (not shown in FIG. 7A). The decoding unit is configured to decode the signal received from the terminal devices to obtain the data transmitted by the terminal devices. The decoding unit can use the NOMA technology to decode the data. The retransmitting unit is configured to send a retransmission request to the collided terminal devices or a part thereof when decoding by the decoding unit fails. The decoding unit then decodes the retransmitted data. The decoding unit can also use historical data before the retransmission to perform a joint decoding.

The electronic device 500 may further include, for example, a communication unit 505 and a memory 506.

The communication unit 505 can be configured to communicate with the terminal devices under control of the processing circuitry 501. In one example, the communication unit 505 can be implemented as a transceiver. The communication unit 505 is depicted with a dotted line since it can also be located externally to the electronic device 500.

The memory 506 can store various information generated by the processing circuitry 501 (e.g., information on the grouping of the terminal devices, information on the contention window for each terminal device group, the data decoded by the decoding unit, etc.), a program for operating the electronic device 500, data to be operated by the electronic device 500 (e.g., the data configuration characteristics, the statistical measures of data transmission, the channel state information, etc.), data to be transmitted by the communication unit 505, and the like. The memory 506 is depicted in a dotted line since it may also be located within the processing circuitry 501 or externally to the electronic device 500. The memory 506 can be a volatile memory and/or a non-volatile memory. For example, the memory 506 can include, but is not limited to, a random access memory (RAM), a dynamic random access memory (DRAM), a static random access memory (SRAM), a read only memory (ROM) or a flash memory.

6. Electronic Device on Terminal Device Side and Its Communication Method

Figure 8A:
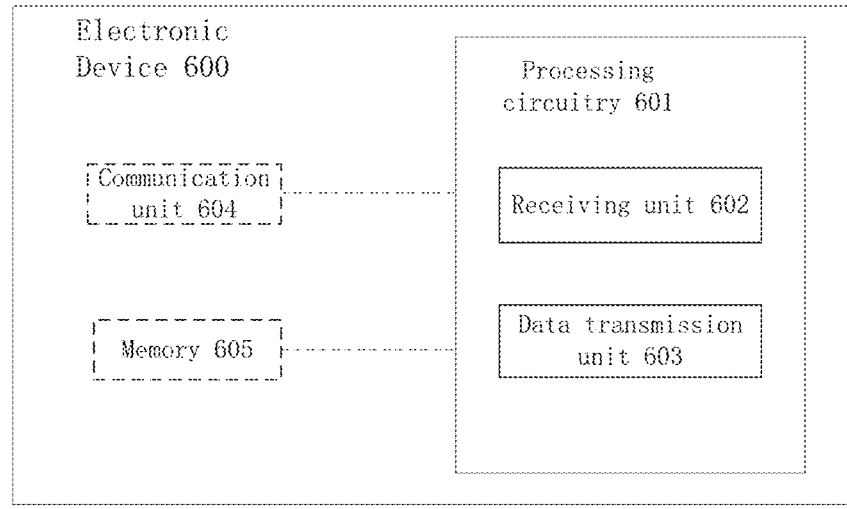
FIGS. 8A-8B illustrate an electronic device on terminal device side and a communication method thereof according to an embodiment of the present disclosure.

FIG. 8A is a block diagram illustrating a configuration of an electronic device 600 on the terminal device side according to an embodiment.

The electronic device 600 is located in a terminal device and can communicate with a control device (such as the electronic device 500 described above).

Figure 8B:
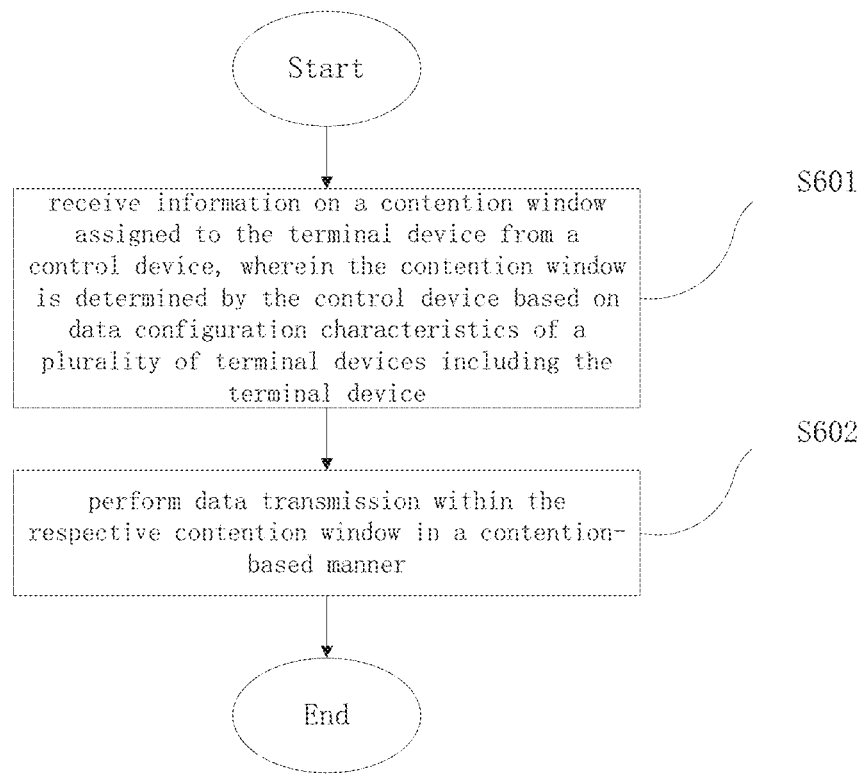

As shown in FIG. 8A, the electronic device 600 includes at least a processing circuitry 601, and the processing circuitry 601 may be at least configured to perform various steps of the communication method as shown in FIG. 8B. Similar to the processing circuitry 501, the processing circuitry 601 may refer to various implementations of a digital circuitry, an analog circuitry, or a circuitry for hybrid signal (a combination of analog signal and digital signal) that perform functions in a computing system. The processing circuitry may include, for example, a circuitry such as an integrated circuit (IC), an application specific integrated circuit (ASIC), a portion or circuit of an individual processor core, an entire processor core, an individual processor, a programmable hardware device such as a field programmable array (FPGA), and/or a system including multiple processors.

The processing circuitry 601 includes a receiving unit 602 and a data transmitting unit 603.

The receiving unit 602 is configured to receive information on a contention window assigned to the terminal device from the control device (step S601 in FIG. 8B). The contention window is determined by the control device based on data configuration characteristics of a plurality of terminal devices including this terminal device. In one example, the contention window received by the receiving unit 602 is periodic, so that the data transmitting unit 603 transmits data regularly.

The data transmitting unit 603 is configured to perform data transmission within the respective contention window in a contention-based manner (step S602 in FIG. 8B). The data transmitting unit 603 makes a random access to the control device and transmits data using available transmission resources, where these transmission resources can be shared by other terminal devices in the same group.

In one example, the data transmitting unit 603 is configured to perform the data transmission through the NOMA technology.

The data transmitting unit 603 is further configured to retransmit the data in response to receiving a retransmission request from the control device.

The processing circuitry 601 may further include, for example, a communication unit 604 and a memory 605.

The communication unit 604 may be configured to communicate with the control device under the control of the processing circuitry 601. In one example, the communication unit 604 may be implemented as a transceiver. The communication unit 604 is drawn with a dotted line because it can also be located externally to the electronic device 600.

The memory 605 may store various data generated by the processing circuitry 601 (for example, information on the contention window received by the receiving unit 602), a program for operating the electronic device 600, data to be transmitted by the communication unit 604, and the like. The memory 605 is depicted in a dotted line since it may also be located within the processing circuitry 601 or externally to the electronic device 600. The memory 604 can be a volatile memory and/or a non-volatile memory. For example, the memory 604 can include, but is not limited to, a random access memory (RAM), a dynamic random access memory (DRAM), a static random access memory (SRAM), a read only memory (ROM) or a flash memory.

7. Signaling Process of Uplink Data Transmission

Figure 9:
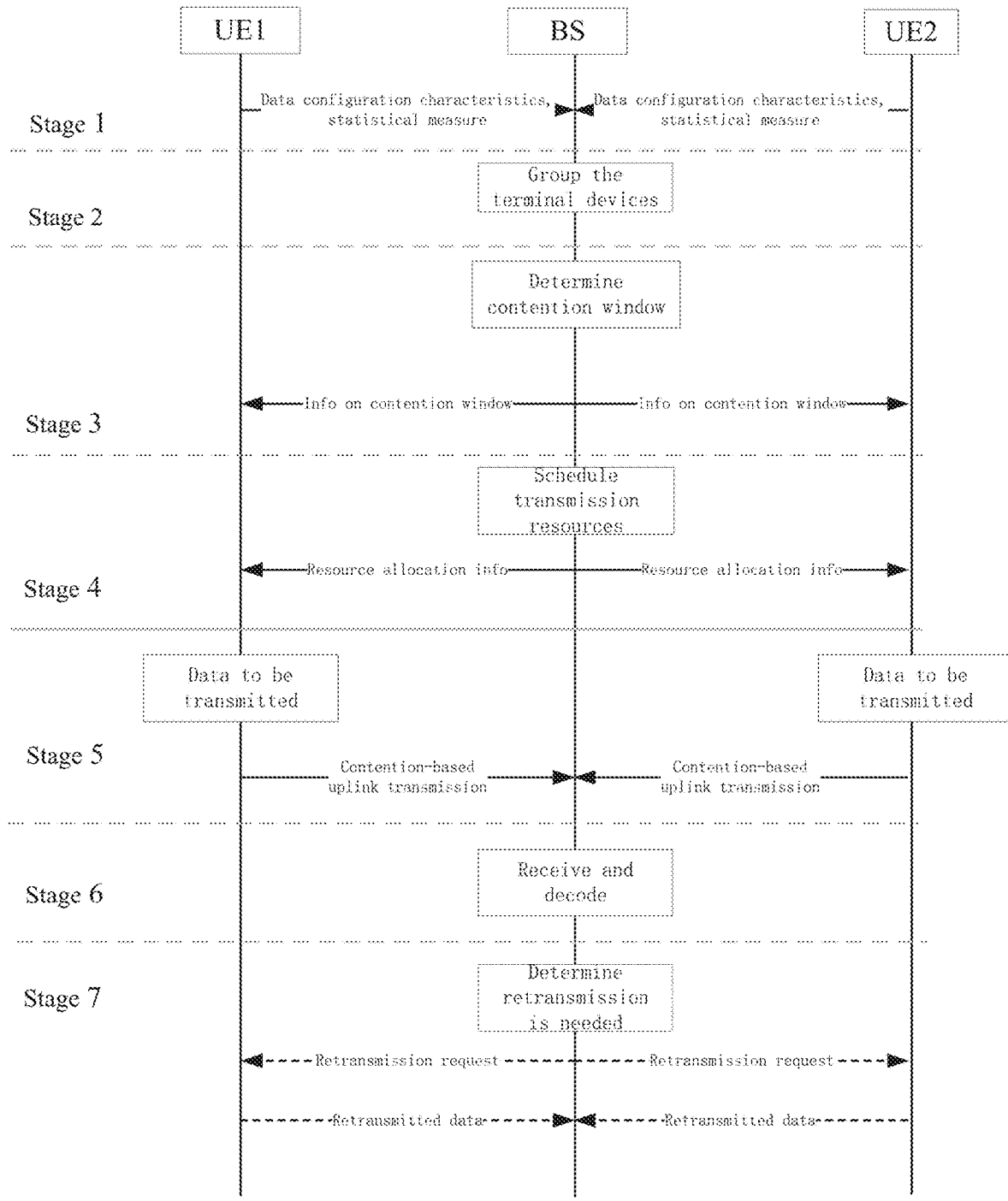
FIG. 9 illustrates an exemplary communication flow according to an embodiment of the present disclosure.

FIG. 9 illustrates a signaling flow of the uplink data transmission according to an embodiment of the present disclosure. Only two terminal devices UE1 and UE2 are schematically shown in FIG. 9, but it should be understood that the number of terminal devices is not limited to this. In scenarios such as the factory automation, each automation cell may include many terminal devices.

As shown in FIG. 9, in Stage 1, the control device BS acquires the data configuration characteristics and/or statistical measure, for example, by the control device BS pulling or requesting from the terminal devices UE1, UE2, or by the terminal device UE1 UE2 pushing to the control device BS.

In addition, the control device BS can also acquire the data configuration characteristics from a database of the management system.

In Stage 2, the control device BS groups the terminal devices based on the data configuration characteristics, or adjusts the grouping of the terminal devices based on the statistical measure. Depending on the result of grouping, UE1 and UE2 may be grouped into the same group, or may be grouped into different groups.

In Stage 3, the control device BS determines a contention window for each terminal device group and sends information on the corresponding contention window to each of the terminal devices via a control channel.

In Stage 4, the control device BS performs the resource scheduling, allocates transmission resources on basis of terminal device group, and transmits resource allocation information to each of the terminal devices via the control channel.

As described in the previous section, the operations of Stage 3 and Stage 4 can be combined, for example, the contention window for each terminal device group can be embodied by the set of transmission resources allocated to it.

In Stage 5, the terminal devices UE1 and UE2 perform the contention-based uplink data transmission within the corresponding contention window via the data channel when they have data to be transmitted.

In Stage 6, the control device BS receives the transmission signals from the terminal devices and decodes them, thereby obtaining data of each terminal device.

Optionally, the signaling process may further include Stage 7. When two or more terminal devices in the same group transmit data simulatenously and thus a collision occurs, the control device BS fails to decode the mixed signal of these terminal devices, and the control device BS manages such collision with a collision decision (such as the collision decision as described in the above section). In Stage 7, the control device BS determines the terminal devices that need to retransmit, such as all or a part of the terminal devices that have collided, and sends a retransmission request to them. In response to receiving the retransmission request, the terminal devices retransmit the data via the data channel.

8. Simulation

The technical effect achieved by the uplink transmission scheme of the present disclosure is verified by simulation below. Assuming that data arrives randomly, the average latencies of the following three uplink transmission methods are simulated: (1) the traditional ALOHA; (2) the contention-based uplink transmission without grouping; (3) the contention-based uplink transmission with grouping as described in this disclosure. In the simulation, it is considered that the data arrival of the terminal device comes from two aspects, one is being generated by itself and in no relation to other terminal devices, and the other is being caused by the data generation of other terminal devices.

The specific simulation process is as follows: first, the data arrival of each of terminal devices is modelled with an arrival rate, that is, to determine a probability that a packet is generated in each time slot, and a probability that other terminal devices are caused to generate data after the data generation of the terminal device. Next, the whole communication process is simulated, and the specific results are as follows:

TABLE 1

| Average latency of uplink transmission | | | |
|---|---|---|---|
| | Traditional ALOHA | Contention-based (without grouping) | Contention-based (with grouping) |
| Average latency | 97.94 | 40.04 | 21.46 |

As can be seen from the above Table 1, the contention-based uplink transmission according to the present disclosure can further reduce the latency. In addition, compared with the traditional contention-based uplink transmission (without grouping), the contention-based transmission (with grouping) according to the present disclosure can ensure a high reliability.

Various aspects of the embodiment of the present disclosure have been described in detail above. The factory automation is described as an example of the URLLC scenario in the present disclosure, but it should be understood that the application scenario of the present disclosure is not limited to the factory automation scenario, or even to the URLLC scenario. The improved contention-based uplink transmission scheme proposed by the present disclosure can be applied to any application scenario that has high requirements on latency and reliability.

In addition, it should be understood that the units of the electronic devices 500 and 600 described in the above embodiment are only logical modules divided according to the specific functions they implement, and are not intended to limit specific implementations. In actual implementations, the above units may be implemented as independent physical entities, or may be implemented by a single entity (for example, a processor (CPU or DSP, etc.), an integrated circuit, etc.).

9. Exemplary Implementation of the Present Disclosure

According to the embodiment of the present disclosure, various implementations that embody the concepts of the present disclosure are conceivable, including but not limited to:

1). An electronic device on control device side, comprising a processing circuitry which is configured to: group a plurality of terminal devices based on data configuration characteristics of the plurality of terminal devices; determine a contention window for each group; and notify each of the plurality of terminal devices of the contention window associated therewith, such that each of the terminal devices is able to perform data transmission within the respective contention window in a contention-based manner.

2. The electronic device of 1), wherein the processing circuitry is further configured to: regroup the plurality of terminal devices based on statistical measure of the data transmissions of the plurality of terminal devices.

3). The electronic device of 2), wherein the statistical measure includes at least one of a transmission success rate of packets and an average transmission time of packets.

4). The electronic device of 2), wherein the processing circuitry is further configured to: receive information on the statistical measures pushed by the plurality of terminal devices.

5). The electronic device of 2), wherein the processing circuitry is further configured to: request the plurality of terminal devices for the statistical measures; and receive information on the statistical measures from the plurality of terminal devices.

6). The electronic device of 1), wherein the processing circuitry is further configured to: receive information on the data configuration characteristics pushed by the plurality of terminal devices.

7). The electronic device of 1), wherein the processing circuitry is further configured to: request the plurality of terminal devices for the data configuration characteristics; and receive information on the data configuration characteristics from the plurality of terminal devices.

8). The electronic device of 1), wherein a particular terminal device in the plurality of terminal devices can be included in one or more groups.

9). The electronic device of 1), wherein the contention window for each group is periodic.

10). The electronic device of 1), wherein the processing circuitry is further configured to: allocate transmission resources for each group, such that all of the terminal devices in the group is able to perform the data transmission by using the allocated transmission resources.

11). The electronic device of 1), wherein the contention window for one group and the contention window for another group overlap in time, and the processing circuitry is configured to: allocate mutually different transmission resources to the one group and the another group.

12). The electronic device of 1), wherein the processing circuitry is further configured to decode signals transmitted by the terminal devices in each group.

13). The electronic device of 12), wherein the processing circuitry is further configured to decode signals transmitted simulatenously by at least two terminal devices in the same group by non-orthogonal multiple access (NOMA).

14). The electronic device of 13), wherein the processing circuitry is further configured to: send a retransmission request to at least a portion of the at least two terminal devices when the decoding is unsuccessful.

15). The electronic device of 14), wherein the processing circuitry is further configured to: determine a contention window and allocate transmission resources for the at least a portion of the at least two terminal devices, such that the at least a portion retransmit data in a contention-based manner.

16). The electronic device of 14), wherein the processing circuitry is further configured to: allocate mutually different transmission resources for the at least a portion of the at least two terminal devices, such that the at least a portion retransmit data in a non contention-based manner.

17). The electronic device of 15) or 16), wherein the processing circuitry is further configured to perform the decoding by combining a signal received before the retransmission and a signal after the retransmission.

18). The electronic device of 1), wherein the data configuration characteristics associated with a particular terminal device include at least one of: an ID of the particular terminal device, a location of the particular terminal device, a number of a process in which the particular terminal device participates, a number of an operation performed by the particular terminal device, a period of generating data by the particular terminal device, a length of a packet, a latency constraint on data transmission, a reliability constraint on data transmission, and a service quality category index of data.

19). The electronic device of 1), wherein the processing circuitry is further configured to group the plurality of terminal devices by determining dependencies among the plurality of terminal devices based on the data configuration characteristics, and grouping the terminal devices having dependencies higher than a threshold into a group.

20). The electronic device of 1), wherein the processing circuitry is further configured to group the plurality of terminal devices by determining service priorities of the plurality of terminal devices based on the data configuration characteristics, and grouping the terminal devices having service priorities higher than a threshold into a group.

21). An electronic device on terminal device side, comprising a processing circuitry which is configured to: receive information on a contention window allocated to the terminal device from a control device, wherein the contention window is determined by the control device based on data configuration characteristics of a plurality of terminal devices including the terminal device; and perform data transmission within the respective contention window in a contention-based manner.

22). The electronic device of 21), wherein the processing circuitry is further configured to: determine a statistical measure of the data transmission over a time period; and send information on the statistical measure to the control device.

23). The electronic device of 22), wherein the statistical measure includes at least one of a transmission success rate of packets and an average transmission time of packets.

24). The electronic device of 21), wherein the processing circuitry is further configured to push information on the data configuration characteristics and/or information on the statistical measure to the control device.

25). The electronic device of 21), wherein the processing circuitry is further configured to: receive a request for the data configuration characteristics and/or the statistical measure from the control device; and send information on the data configuration characteristics and/or information on the statistical measure to the control device.

26). The electronic device of 21), wherein the contention window is periodic.

27). The electronic device of 21), wherein the processing circuitry is configured to perform the data transmission by non-orthogonal multiple access (NOMA).

28). The electronic device of 21), wherein the processing circuitry is configured to: in response to a retransmission request received from the control device, retransmit data by using allocated transmission resources.

29). A communication method, comprising: grouping a plurality of terminal devices based on data configuration characteristics of the plurality of terminal devices; determining a contention window for each group; and notifying each of the plurality of terminal devices of the contention window associated therewith, such that each of the terminal devices is able to perform data transmission within the respective contention window in a contention-based manner.

30). A communication method, comprising: receiving information on a contention window allocated to the terminal device from a control device, wherein the contention window is determined by the control device based on data configuration characteristics of a plurality of terminal devices including the terminal device; and performing data transmission within the respective contention window in a contention-based manner.

31). A non-transitory computer readable storage medium storing executable instructions which, when executed, perform the communication method according to 29) or 30).

32). An electronic device on control device side, comprising a processing circuitry which is configured to: receive data transmitted simulatenously by at least two terminal devices in the same contention window in a contention-based manner; and send a retransmission request to a portion of the at least two terminal devices in response to determining that the data cannot be decoded.

APPLICATION EXAMPLE OF THE PRESENT DISCLOSURE

The technology described in the present disclosure can be applied to various products.

For example, the electronic device 500 according to the embodiment of the present disclosure may be implemented as various base stations or installed in various base stations. The communication method as shown in FIG. 7B can be implemented by various based stations. The electronic device 600 according to the embodiment of the present disclosure may be implemented as various terminal devices or installed in various terminal devices. The communication method as shown in FIG. 8B can be implemented by various terminal devices.

The control device as described in the present disclosure may be implemented as any type of base stations, preferably, such as the macro gNB or the small gNB in the NR (New Radio) access technology of the 3GPP 5G communication standard. A small gNB may be an gNB that covers a cell smaller than a macro cell, such as a pico gNB, micro gNB, and home (femto) gNB. Instead, the base station may be implemented as any other types of base stations such as a NodeB, eNodeB and a base transceiver station (BTS). The base station may include a main body configured to control wireless communication, and one or more remote radio heads (RRH), a wireless relay, a drone control tower, main control unit in an automation cell or the like disposed in a different place from the main body.

The terminal device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (that is also referred to as a machine type communication (MTC) terminal) that performs machine-to-machine (M2M) communication, a drone, a sensor or actuator in an automation cell or the like. Furthermore, the terminal device may be a wireless communication module (such as an integrated circuit module including a single die) mounted on each of the above terminals.

1. Application Examples of the Base Station

It will be appreciated that as used in the present disclosure, the term "base station" has the full breadth in its generic sense, and includes at least a wireless communication station used as a portion of a wireless communication system or a radio system for purpose of communication. Examples of the base station can be for example but not limited to the following: either or both of the base transceiver station (BTS) and the base station controller (BSC) in the GSM system; either or both of the radio network controller (RNC) or NodeB in the 3G communication system; eNB in the LTE and LTE-Advanced system; corresponding network nodes in future communication systems (for example, the gNB possibly appearing in the 5G communication system, or the like). In communication scenarios such as D2D, M2M and V2V, a logical entity having a control function over the communication can be referred to a base station. In the scenario of cognitive radio communication, a logical entity having a function of frequency spectrum coordination can also be referred to a base station.

First Application Example

Figure 10:
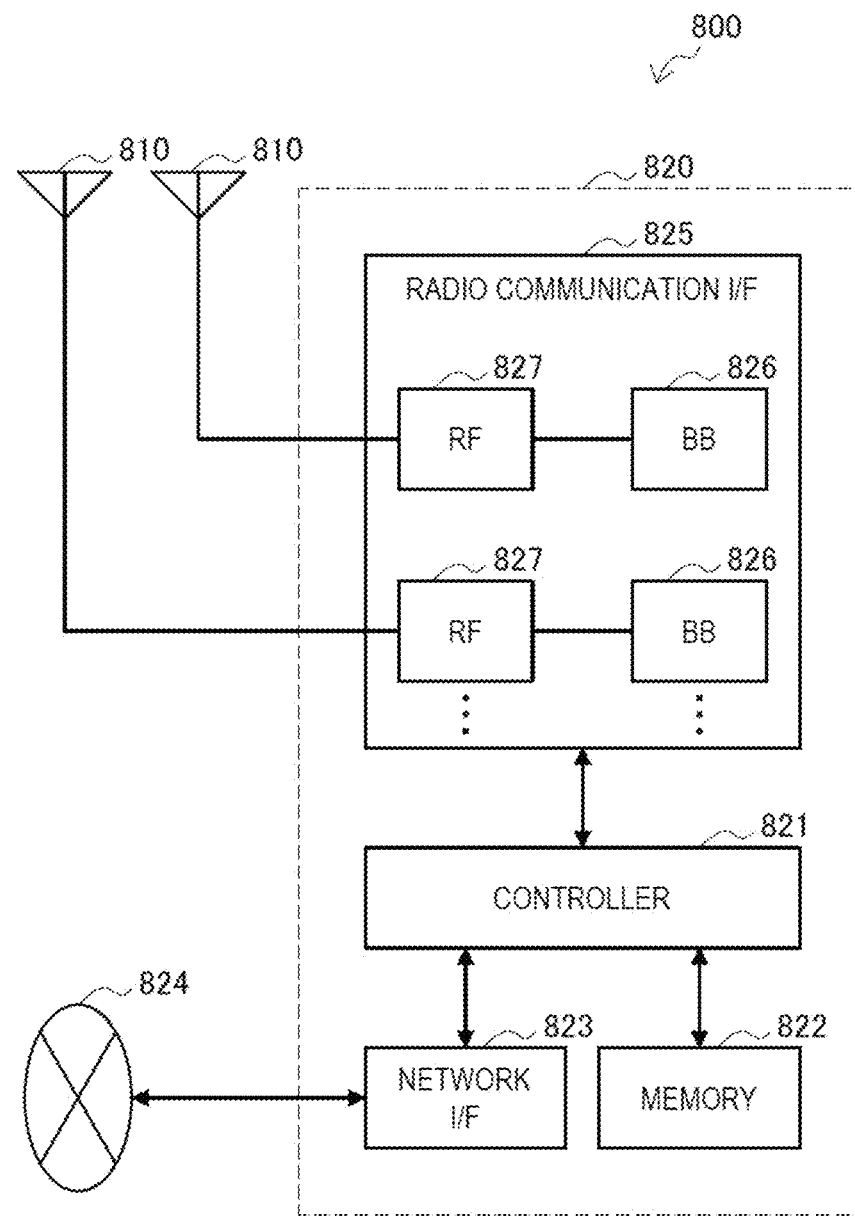
FIG. 10 illustrates a first example of exemplary configuration of the control device according to an embodiment of the present disclosure.

FIG. 10 is a block diagram illustrating a first example of a schematic configuration of the base station to which a technology of the present application may be applied. In the downlink transmission, the base station may be implemented as or included in the electronic device 500. In FIG. 10, the base station is illustrated as an gNB 800. The gNB 800 includes a plurality of antennas 810 and a base station device 820. The base station device 820 and each antenna 810 may be connected with each other via a RF cable.

The antennas 810 may include multiple antenna elements (such as multiple antenna elements included in a Multiple Input and Multiple Output (MIMO) antennas), and is used for the base station 820 to transmit and receive radio signals. The gNB 800 may include multiple antennas 810, as illustrated in FIG. 10. For example, the multiple antennas 810 may be compatible with multiple frequency bands used by the gNB 800. FIG. 20 illustrates the example in which the gNB 800 includes multiple antennas 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 may include the processing circuitry 601 as described above, perform the communication method as described with reference to FIG. 7B, or control the components of the electronic device 500 (such as the grouping unit 502, the determining unit 503, the notifying unit 504 and the decoding unit or retransmitting unit that are not shown). For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an gNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 824. The controller 821 may communicate with a core network node or another gNB via the network interface 823. In that case, the gNB 800, and the core network node or the other gNB may be connected to each other through a logical interface such as an S1 interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE), LTE-Advanced or NR, and provides radio connection to a terminal positioned in a cell of the gNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 10. For example, the multiple BB processors 826 may be compatible with multiple frequency bands used by the gNB 800. The radio communication interface 825 may include the multiple RF circuits 827, as illustrated in FIG. 10. For example, the multiple RF circuits 827 may be compatible with multiple antenna elements. Although FIG. 10 illustrates the example in which the radio communication interface 825 includes the multiple BB processors 826 and the multiple RF circuits 827, the radio communication interface 825 may also include a single BB processor 826 or a single RF circuit 827.

In the gNB 800 illustrated in FIG. 10, one or more of the units included in the processing circuitry 501 described with reference to FIG. 7A may be implemented in the radio communication interface 825. Alternatively, at least a part of these components may be implemented in the controller 821. As an example, the gNB 800 includes a part (for example, the BB processor 826) or the entire of the radio communication interface 825 and/or a module including the controller 821, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 800, and the radio communication interface 825 (for example, the BB processor 826) and/or the controller 821 may execute the program. As described above, as a device including the one or more components, the gNB 800, the base station device 820 or the module may be provided. In addition, a readable medium in which the program is recorded may be provided.

Second Application Example

Figure 11:
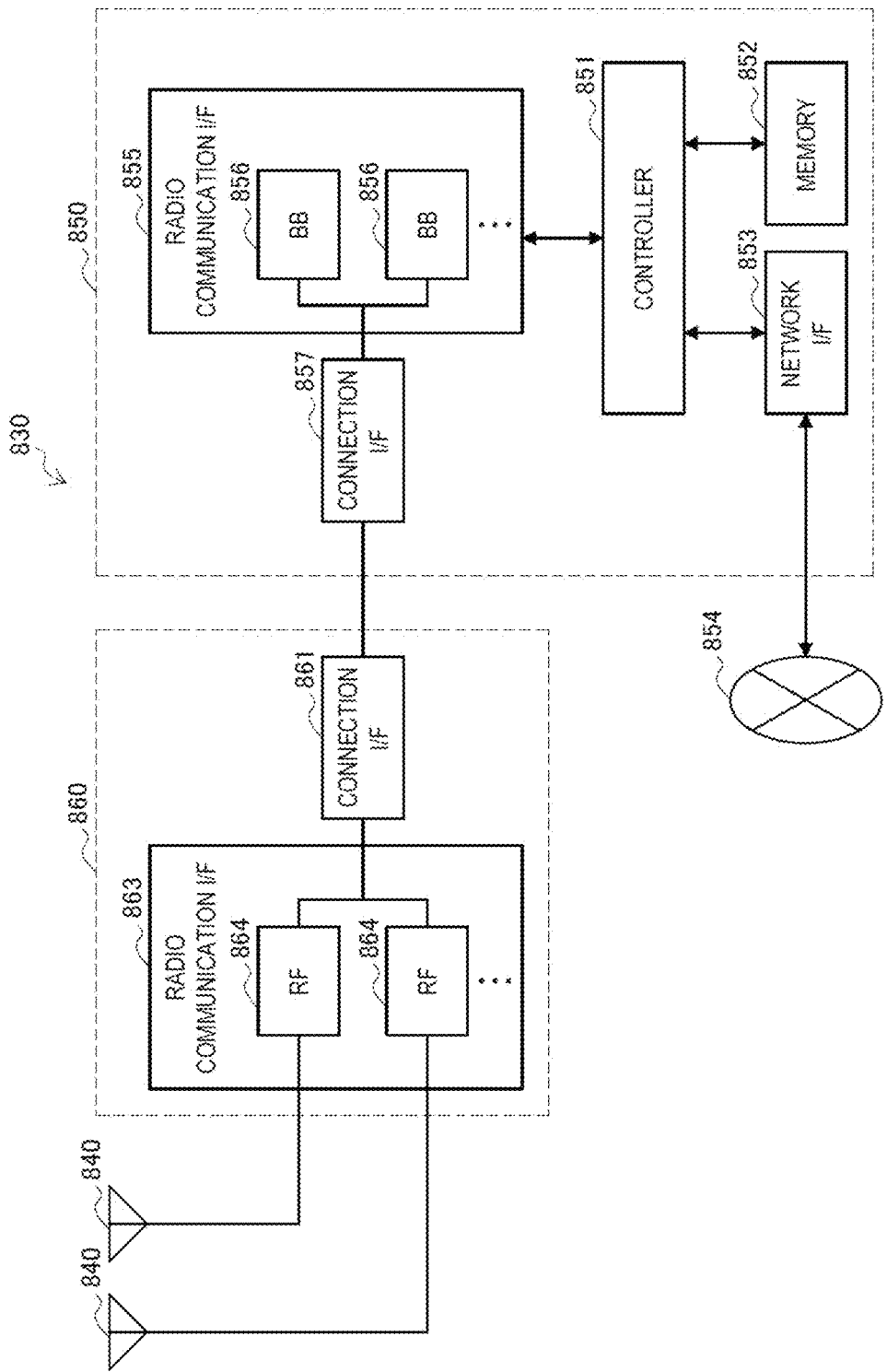
FIG. 11 illustrates a second example of exemplary configuration of the control device according to an embodiment of the present disclosure.

FIG. 11 is a block diagram illustrating a second example of a schematic configuration of the base station to which a technology of the present application may be applied. In FIG. 11, the base station may be implemented as or included in the electronic device 500. In FIG. 11, the base station is illustrated as gNB 830. The gNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

The antennas 840 includes multiple antenna elements such as multiple antenna elements included in an MIMO antenna and is used for the RRH 860 to transmit and receive radio signals. The gNB 830 may include multiple antennas 840, as illustrated in FIG. 11. For example, multiple antennas 840 may be compatible with multiple frequency bands used by the gNB 830. FIG. 11 illustrates an example in which the gNB 830 includes multiple antennas 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme such as LTE, LTE-Advanced or NR, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except the BB processor 856 is connected to the RF circuit 864 of the RRH 860 via the connection interface 857. The radio communication interface 855 may include the multiple BB processors 856, as illustrated in FIG. 11. For example, multiple BB processors 856 may be compatible with multiple frequency bands used by the gNB 830. Although FIG. 11 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 11. For example, multiple RF circuits 864 may support multiple antenna elements. Although FIG. 11 illustrates the example in which the radio communication interface 863 includes the multiple RF circuits 864, the radio communication interface 863 may also include a single RF circuit 864.

In the gNB 830 illustrated in FIG. 11, one or more of the units included in the processing circuitry 501 described with reference to FIG. 7A may be implemented in the radio communication interface 855. Alternatively, at least a part of these components may be implemented in the controller 851. As an example, the gNB 830 include a part (for example, the BB processor 856) or the entire of the radio communication interface 855 and/or a module including the controller 851, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 830, and the radio communication interface 855 (for example, the BB processor 856) and/or the controller 851 may execute the program. As described above, as a device including the one or more components, the gNB 830, the base station device 850 or the module may be provided. A program causing the processor to function as the one or more components may also be provided. In addition, a readable medium in which the program is recorded may be provided.

2. Application Example of the User Device

First Application Example

Figure 12:
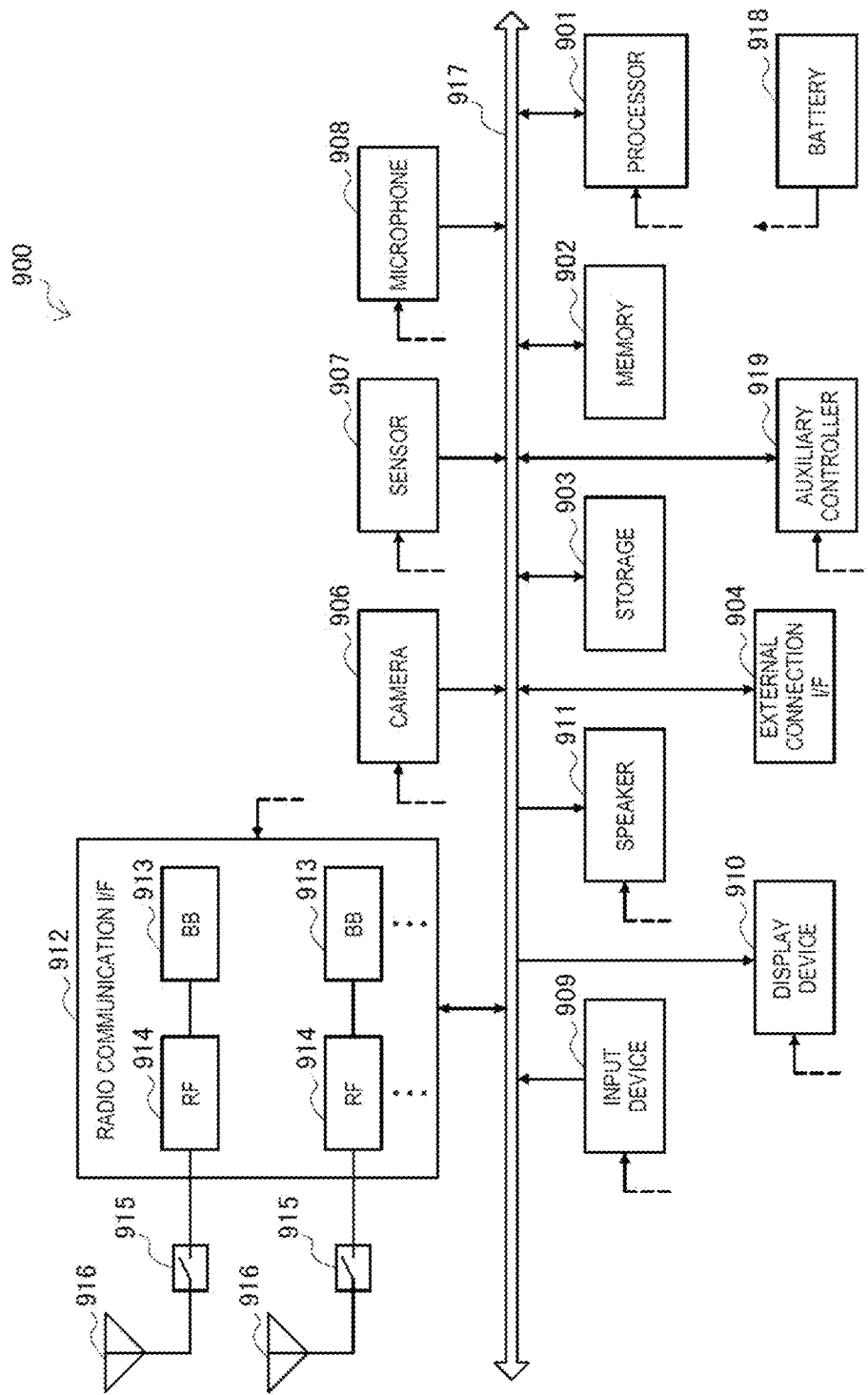
FIG. 12 illustrates an exemplary configuration of a smart phone according to an embodiment of the present disclosure.

FIG. 12 is a block diagram illustrating an example of a schematic configuration of a smartphone 900 to which a technology of the present application may be applied. The smartphone 900 may be implemented as or included in the electronic device 600 as described with reference to FIG. 8A. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and the other layers of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts the sounds that are input to the smartphone 900 to audio signals.

The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE, LTE-Advanced or NR, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that integrates the BB processor 913 and the RF circuit 914 thereon. The radio communication interface 912 may include multiple BB processors 913 and multiple RF circuits 914, as illustrated in FIG. 12. Although FIG. 12 illustrates the example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a wireless local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

The antennas 916 may include multiple antenna elements such as multiple antenna elements included in an MIMO antenna, and is used for the radio communication interface 912 to transmit and receive radio signals. The smartphone 900 may include multiple antennas 916, as illustrated in FIG. 12. Although FIG. 12 illustrates the example in which the smartphone 900 includes multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 12 via feeder lines, which are partially shown as dashed lines in the figure. The auxiliary controller 919 operates a minimum necessary function of the smartphone 900, for example, in a sleep mode.

In the smartphone 900 illustrated in FIG. 12, one or more of the components (for example, the receiving unit 602, the data transmitting unit 603) included in the processing circuitry 601 described with reference to FIG. 8A may be implemented in the radio communication interface 912. Alternatively, at least a part of these components may also be implemented in the processor 901 or the auxiliary controller 919. As an example, the smartphone 900 include a part (for example, the BB processor 913) or the entire of the radio communication interface 912, and/or a module including the processor 901 and/or the auxiliary controller 919, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the smartphone 900, and the radio communication interface 912 (for example, the BB processor 913), the processor 901 and/or the auxiliary controller 919 may execute the program. As described above, as a device including the one or more components, the smartphone 900 or the module may be provided. A program causing the processor to function as the one or more components may also be provided. In addition, a readable medium in which the program is recorded may be provided.

In addition, in the smartphone 900 illustrated in FIG. 12, for example, the communication unit 605 of the electronic device 600 may be implemented in the radio communication interface 912, for example, the RF circuit 914.

Second Application Example

Figure 13:
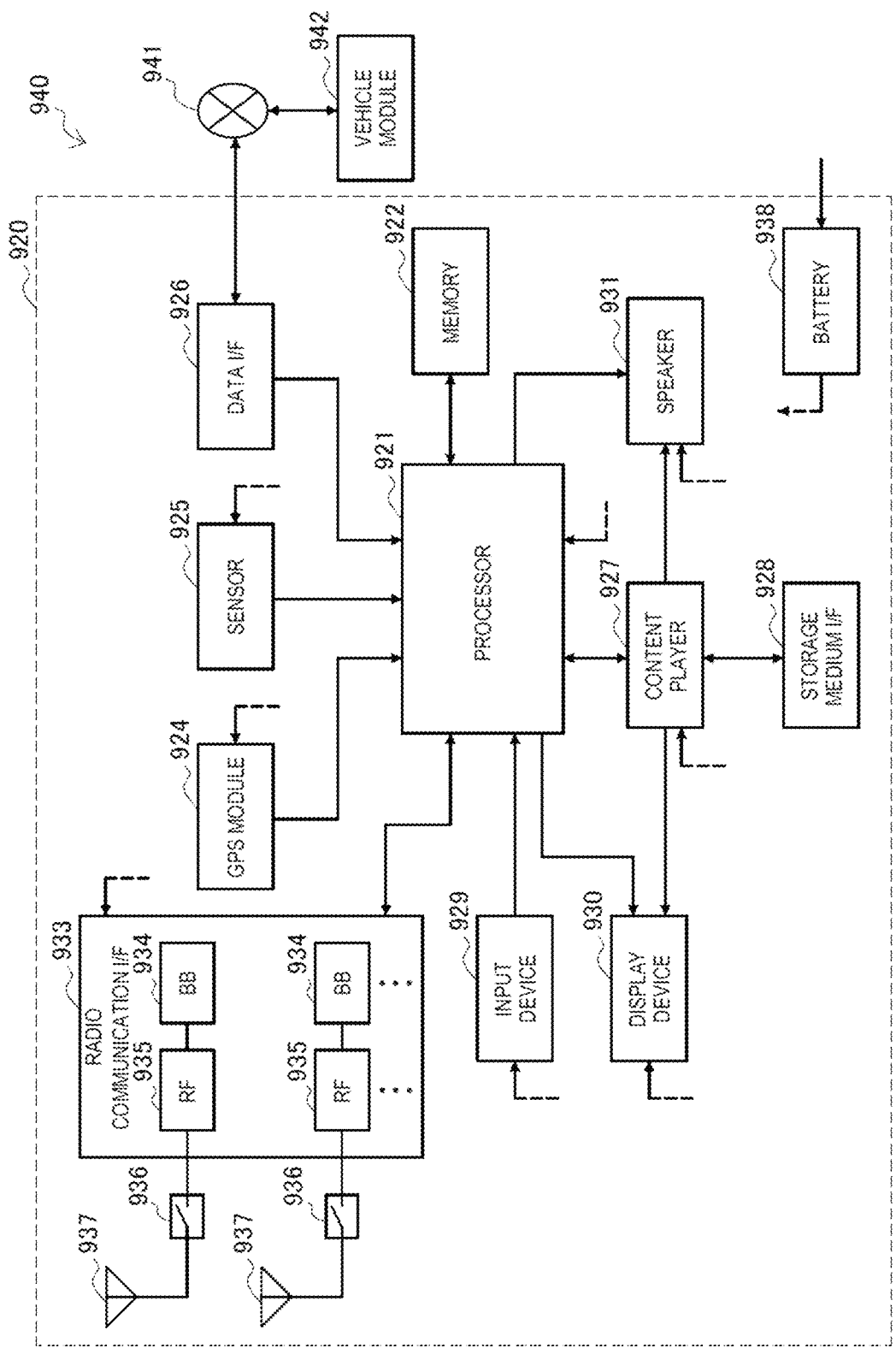
FIG. 13 illustrates an exemplary configuration of a vehicle navigation device according to an embodiment of the present disclosure.

FIG. 13 is a block diagram illustrating an example of a schematic configuration of a car navigation device 920 to which an embodiment of the technology of the present application may be applied. Wherein the smart phone 900 can be implemented as the electronic device 600, 700, 1000, 1500 or 1600 described with reference to the figures. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores a program that is executed by the processor 921, and data.

The GPS module 924 uses GPS signals received from a GPS satellite to measure a position, such as latitude, longitude, and altitude, of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium, such as a CD and a DVD, that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme, such as LTE, LTE-A or NR, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module which integrates the BB processor 934 and the RF circuit 935 thereon. The radio communication interface 933 may include multiple BB processors 934 and multiple RF circuits 935, as illustrated in FIG. 13. Although FIG. 13 illustrates the example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a wireless LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

The antennas 937 may include multiple antenna elements, such as multiple antenna elements included in an MIMO antenna, and is used for the radio communication interface 933 to transmit and receive radio signals. The car navigation device 920 may include the multiple antennas 937, as illustrated in FIG. 13. Although FIG. 13 illustrates the example in which the car navigation device 920 includes multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 13 via feeder lines that are partially shown as dashed lines in the figure. The battery 938 accumulates power supplied from the vehicle.

In the car navigation device 920 illustrated in FIG. 13, one or more of the components (for example, the receiving unit 602, the data transmitting unit 603) included in the processing circuitry 601 described with reference to FIG. 8A may be implemented in the radio communication interface 933. Alternatively, at least a part of these components may also be implemented in the processor 921. As an example, the car navigation device 920 includes a part (for example, the BB processor 934) or the entire of the radio communication interface 933 and/or a module including the processor 921, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the car navigation device 920, and the radio communication interface 933 (for example, the BB processor 934) and/or the processor 921 may execute the program. As described above, as a device including the one or more components, the car navigation device 920 or the module may be provided. A program causing the processor to function as the one or more components may also be provided. In addition, a readable medium in which the program is recorded may be provided.

In addition, in the car navigation device 920 illustrated in FIG. 13, for example, the communication unit 605 described with reference to FIG. 8A may be implemented in the radio communication interface 933, for example, the RF circuit 935.

Technology of the present application may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

In addition, readable medium recording programs therein can be provided. Therefore, the present disclosure further relates to a computer readable storage medium, storing a program including instructions thereon, which are used to perform the communication method as described with reference to FIG. 7B or 8B when loaded and executed by a processing circuitry.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device configured to operate as a base station, comprising:
  processing circuitry, configured to:
  determine first contention window information identifying a first group-specific contention window for a first group of user equipment (UEs),
  determine second contention window information identifying a second group-specific contention window for a second group of UEs,
  wherein the first group-specific contention window is different from the second group-specific contention window, and
  provide first resource information configured to identify one or more first transmission resources for the first group of UEs, and a second resource information configured to identify one or more second transmission resources for the second group of UEs,
  wherein the first resource information and second resource information respectively includes:
    a group identifier configured to identify that a respective UE is assigned to the first group, the second group, or both the first and second groups based on a device-specific configuration characteristic,
    first resource identity information configured to identify one or more first transmission resources for the first group when the respective UE is assigned to the first group, second resource identity information configured to identify one or more second transmission resources when the respective UE is assigned to the second group, and the first and second resource identity information when the respective UE is assigned to the first group and the second group, and
    first contention window information identifying a first group-specific contention window for the first group when the respective UE is assigned to the first group, second contention window information identifying a second group-specific contention window for the second group when the respective UE is assigned to the second group, and the first and second contention window information when the respective UE is assigned to the first group and the second group,
  receive uplink data transmissions from the first group and the second group in accordance with the group information.

2. The electronic device of claim 1, wherein the first resource information is different from the second resource information.

3. The electronic device of claim 1, wherein the processing circuitry is further configured to:
  receive uplink data transmissions from the first group of UEs and the second group of UEs in accordance with the first contention window information, the second contention window information, the first resource information and the second resource information.

4. The electronic device of claim 3, wherein the uplink data transmissions from the first group of UEs and the second group of UEs are simultaneously transmitted with non-orthogonal multiple access (NOMA) data transmissions.

5. The electronic device of claim 4, wherein the processing circuitry is further configured to:
  send a retransmission request to the first group of UEs and the second group of UEs upon failing to decode one of the NOMA data transmissions.

6. The electronic device of claim 5, wherein the retransmission request includes an allocation of resources for a non contention-based retransmission of the one of the NOMA data transmissions.

7. The electronic device of claim 1,
wherein the first group-specific contention window for the first group of UEs and the second group-specific contention window for the second group of UEs overlap in time.

8. A method performed by an electronic device configured to operate as a base station, the method comprising:
determining first contention window information identifying a first group-specific contention window for a first group of UEs,
determining second contention window information identifying a second group-specific contention window for a second group of UEs, wherein the first group-specific contention window is different from the second group-specific contention window, and
providing first resource information configured to identify one or more first transmission resources for the first group of UEs, and a second resource information configured to identify one or more second transmission resources for the second group of UEs,
wherein the first resource information and second resource information respectively includes:
a group identifier configured to identify that a respective UE is assigned to the first group, the second group, or both the first and second groups based on a device-specific configuration characteristic,
first resource identity information configured to identify one or more first transmission resources for the first group when the respective UE is assigned to the first group, second resource identity information configured to identify one or more second transmission resources when the respective UE is assigned to the second group, and the first and second resource identity information when the respective UE is assigned to the first group and the second group, and
first contention window information identifying a first group-specific contention window for the first group when the respective UE is assigned to the first group, second contention window information identifying a second group-specific contention window for the second group when the respective UE is assigned to the second group, and the first and second contention window information when the respective UE is assigned to the first group and the second group,
receive uplink data transmissions from the first group and the second group in accordance with the group information.

9. The method of claim 8, wherein the first resource information is different from the second resource information.

10. The method of claim 8, wherein the method further comprising:
receiving uplink data transmissions from the first group of UEs and the second group of UEs in accordance with the first contention window information, the second contention window information, the first resource information and the second resource information.

11. The method of claim 10, wherein the uplink data transmissions from the first group of UEs and the second group of UEs are simultaneously transmitted with non-orthogonal multiple access (NOMA) data transmissions.

12. The method of claim 11, wherein the method further comprising:
sending a retransmission request to the first group of UEs and the second group of UEs upon failing to decode one of the NOMA data transmissions.

13. The method of claim 12, wherein the retransmission request includes an allocation of resources for a non contention-based retransmission of the one of the NOMA data transmissions.

14. The method of claim 8, wherein the first group-specific contention window for the first group of UEs and the second group-specific contention window for the second group of UEs overlap in time.

15. A non-transitory computer-readable medium containing instructions for causing an electronic device configured to operate as a base station to perform a method, the method comprising:
determining first contention window information identifying a first group-specific contention window for a first group of UEs,
determining second contention window information identifying a second group-specific contention window for a second group of UEs, wherein the first group-specific contention window is different from the second group-specific contention window, and
providing first resource information configured to identify one or more first transmission resources for the first group of UEs, and second resource information configured to identify one or more second transmission resources for the second group of UEs,
wherein the first resource information and second resource information respectively includes:
a group identifier configured to identify that a respective UE is assigned to the first group, the second group, or both the first and second groups based on a device-specific configuration characteristic,
first resource identity information configured to identify one or more first transmission resources for the first group when the respective UE is assigned to the first group, second resource identity information configured to identify one or more second transmission resources when the respective UE is assigned to the second group, and the first and second resource identity information when the respective UE is assigned to the first group and the second group, and
first contention window information identifying a first group-specific contention window for the first group when the respective UE is assigned to the first group, second contention window information identifying a second group-specific contention window for the second group when the respective UE is assigned to the second group, and the first and second contention window information when the respective UE is assigned to the first group and the second group,
receive uplink data transmissions from the first group and the second group in accordance with the group information.

* * * * *